US006829489B2

United States Patent
Yamamoto et al.

(10) Patent No.: US 6,829,489 B2
(45) Date of Patent: Dec. 7, 2004

(54) COMMUNICATION SYSTEM, TRANSMITTER, RECEIVER, AND COMMUNICATION METHOD

(75) Inventors: Kazushi Yamamoto, Tokyo (JP); Hideshi Murai, Kanagawa (JP); Yasuhiro Yano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 407 days.

(21) Appl. No.: 09/843,101

(22) Filed: Apr. 27, 2001

(65) Prior Publication Data

US 2002/0013156 A1 Jan. 31, 2002

Related U.S. Application Data

(63) Continuation of application No. PCT/JP00/04288, filed on Jun. 29, 2000.

(30) Foreign Application Priority Data

Aug. 27, 1999 (JP) ............................................ 11-241217

(51) Int. Cl.[7] .................................................. H04Q 7/20
(52) U.S. Cl. ...................... 455/522; 455/13.4; 370/318
(58) Field of Search ........................ 455/69, 522, 552.1, 455/13.4, 62, 71, 72, 70, 131, 139; 375/326, 338, 221, 358; 342/357.05; 370/318, 320, 335, 441

(56) References Cited

U.S. PATENT DOCUMENTS

| | | | | |
|---|---|---|---|---|
| 5,828,659 A | * | 10/1998 | Teder et al. ................ | 370/328 |
| 5,896,368 A | * | 4/1999 | Dahlman et al. ........... | 370/335 |
| 6,154,652 A | * | 11/2000 | Park et al. .................. | 455/437 |
| 6,246,732 B1 | * | 6/2001 | Kobayashi et al. ......... | 375/346 |
| 6,289,009 B1 | * | 9/2001 | Sato ............................ | 370/342 |
| 6,504,835 B1 | * | 1/2003 | Menzel et al. .............. | 370/345 |
| 6,512,750 B1 | * | 1/2003 | Palenius ...................... | 370/318 |

FOREIGN PATENT DOCUMENTS

| | | |
|---|---|---|
| EP | 0 825 732 A2 | 8/1997 |
| WO | WO 94/29981 | 12/1994 |
| WO | WO 95/27380 | 4/1995 |

OTHER PUBLICATIONS

Gustafsson M. et al., "Compressed Mode Techniques for Inter–Frequency Measurement sin a Wide–Band DS–CDMA System," Pro. of 8th IEEE PIMRC '97, vol. 1, Sep. 1997, pp. 231–235.

Karim Jamal et al., "Techniques for Facilitating Inter–Frequency Handover in a Wide–band DS–CDMA System," Technical research report, The Institute of Electronics, Information and Communication Engineers, vol. 97, No. 31, 1997, pp. 9–15.

Hakan Eriksson et al., "Multiple access options for Cellular Based Personal Communication," IEEE Vehicular Technology Conference, vol. 43, May 1993, pp. 957–962.

* cited by examiner

Primary Examiner—Jean Gelin
(74) Attorney, Agent, or Firm—Oblon, Spivak, McClelland, Maier & Neustadt, P.C.

(57) ABSTRACT

The communication system comprises a transmitter (1A) and a receiver (2A). Both, the transmitter (1A) and the receiver (2A) are capable of operating in a normal mode or a compressed mode in which setting of a predetermined idle time is allowed. The transmitter (1A) effects transmission power control to a frame in each mode. When operating in the compressed mode, the transmitter (1A) inserts of the idle time in such a manner so as to reduce adverse affect of a transmission power control error that occurs after the idle time.

19 Claims, 23 Drawing Sheets

TGL=7, RL=3

| b | c=b/(15-TGL) |
|---|---|
| 4 | 3/8 |
| 3 | 3/8 |
| 2 | 2/8 |
| 1 | 1/8 |
| 0 | 0/8 |

(b)

TGL=7, RL=2

| b | c=b/(15-TGL) |
|---|---|
| 4 | 2/8 |
| 3 | 2/8 |
| 2 | 2/8 |
| 1 | 1/8 |
| 0 | 0/8 |

(c)

TGL=7, RL=1

| b | c=b/(15-TGL) |
|---|---|
| 4 | 1/8 |
| 3 | 1/8 |
| 2 | 1/8 |
| 1 | 1/8 |
| 0 | 0/8 |

COMMUNICATION SYSTEM, TRANSMITTER, RECEIVER, AND COMMUNICATION METHOD

CROSS REFERENCES

This application is a Continuation of co-pending International Application PCT/JP00/04288, which has not been published in English, has an International filing date of Jun. 29, 2000, and has a priority date of Aug. 27, 1999, based on Japanese-Laid-Open-Document No. JP11-241217. The entire disclosure of both of these documents is hereby incorporated herein by reference.

TECHNICAL FIELD

The present invention relates to a communication system adaptable to a radio communication, such as a mobile communication and a satellite communication. More particularly, this invention relates to a communication system, a transmitter, a receiver, and a communication method capable of reducing characteristics deterioration at compressed mode transmission in a CDMA (Code Division Multiple Access) communication system.

BACKGROUND ART

A conventional communication system will be explained here. For example, in the CDMA cellular system, the same carrier frequency is repetitively used within a cell, and handover between the frequencies is not necessary within the same cell. However, when the CDMA cellular system coresides with the existing system, handover between different carrier frequencies becomes necessary. Three concrete examples of handover between different carrier frequencies are given below.

The first example is the handover of the frequency between adjacent cells. When different carrier frequencies are assigned to adjacent cells, because the traffic is heavy due to of an increase of the number of subscribers, handover becomes necessary between such cells. The second example is the handover of the frequency between cells of the umbrella structure. For example, when the umbrella structure is formed, different carrier frequencies are assigned to large and small cells, and the handover is necessary between these cells. The third example is the handover of the frequency between the third generation system represented by the W(Wide)-CDMA system and the second generation system represented by the current cellular phone system.

When the handover takes place under the foregoing conditions, it is necessary to detect the power of different frequency carriers. In order to perform such detection, the receiver must be able to detect two frequencies. However, if the receiver is to detect two frequencies, the necessary structure makes the arrangement of the receiver either larger in size or complex in structure.

The handover method includes two types: handover led by a mobile station (Mobile Assisted Handover: MAHO) and handover led by a network (Network Assisted Handover: NAHO). In NAHO, the load on the mobile station is less as compared to MAHO, however, synchronization with each mobile station becomes necessary in the base station. Furthermore, in NAHO, in order to trace each mobile station separately, the arrangement of the base station/network becomes complex and huge.

Thus, MAHO is preferable from the point of view from the mobile station. However, in order to judge whether the handover should take place or not, intensities of two different frequency carriers have to be observed. Different from the TDMA (Time Division Multiple Access) system used in the second generation, the CDMA cellular system generally uses continuous transmission for both transmission and reception. Hence, in order to observe the intensities of two different frequency carriers, the transmission or reception timing has to be suspended to observe the other frequency unless a receiving device capable of handling two frequencies is prepared.

Accordingly, in the conventional communication system, a technique related to a compressed mode has been proposed, in which transmission information in the normal mode is time compressed, so that the compressed information is transmitted in a shorter time and the other frequency carrier is observed in the remaining time. One example is described in PCT Unexamined patent Publication No. 8-500475 entitled as "Discrete Transmission for Seamless Handover in DS-CDMA System". This publication discloses means to attain a compressed mode for cutting a data transmission time shorter by reducing a spreading factor of used spreading codes.

The compressed mode disclosed in the above publication will be explained in brief. FIG. 20 is a view showing a transmission example in the normal mode and compressed mode in the conventional CDMA cellular system. Vertical axis represents the power rate/transmission power and horizontal axis represents time. Compressed mode transmission is interposed between normal transmission frames. For example, in case of transmission in the compressed mode, a non-transmission time is set within a descending frame (compressed frame). The time length can be set arbitrarily. The non-transmission time is used as an idle time during which the intensity of the other frequency carrier is measured. As has been discussed, in the conventional CDMA cellular system, interposing the idle time between the compressed mode frame transmissions allows slot transmission.

Also, at the foregoing compressed mode transmission, the transmission power increases with a time ratio between the idle time and frame (compressed mode frame) transmission time. Thus, as is shown in FIG. 20, the compressed mode frame is transmitted at higher transmission power than the normal transmission frame. Consequently, it is possible to maintain the transmission quality at the frame transmission in the compressed mode.

Besides the foregoing publication, the references as to the compressed mode include Gustafsson, M. et. al., "Compressed Mode Techniques for Inter-Frequency Measurements in a Wide-band DS-CDMA System", Proc. of 8th IEEE PIMRC, '97. The latter publication discloses means to attain the compressed mode in case of increasing a coding rate, using multi-code transmission, or using multi-bit transmission modulation system, such as 16 QAM, besides the case of reducing the spreading factor.

On the other hand, in the conventional CDMA cellular system, in order to solve the "perspective (near-and-far) problem" that an undesired signal from a nearby station interferes with a desired signal from a remote station, transmission power control to the mobile station is effected so that the reception power in each base station will be equal. Hence, in the conventional CDMA cellular system, the channel state that is changed with time by adverse affect, such as fading, is corrected, so that not only can the required communication quality be secured at the receiver station, but also the line capacity can be utilized efficiently. The following description will describe the transmission power control in the conventional communication system with reference to the accompanying drawings.

FIG. 21 is a view showing the transmission power control at the normal mode transmission in the conventional communication system. To begin with, the receiver station determines reception power on the target such that meets the required communication quality, that is, target power. Here, the required communication quality on the target is not limited to the reception power, and may be a power ratio (SIR: Signal-to-Interference Ratio) between a desired signal and an interference signal instead. Then, the receiver station compares the power of the received desired signal with the target power, and if the former is greater than the latter, the receiver station sends a transmission power control command (TPC) to the transmitter station to lower the transmission power, and if the former is smaller than the latter, the receiver station sends a TPC command to the transmitter station to increase the transmission power. Upon receipt of the TPC command, the transmitter station changes the transmission power by using prescribed power amplitude: Δ in accordance with the content in the TPC command. Here, the transmission power control is performed per time unit called as a slot to follow a change in the channel state (channel state) shown in the drawing. Either a fixed value or a value that varies in accordance with a certain rule is given as the value of Δ.

FIG. 22 is a view showing the transmission power control at the compressed mode transmission in the conventional communication system. The target power is not changed between the normal mode transmission and compressed mode transmission for ease of explanation. However, in general, there is a case that the set value of the target power is changed so as to ensure the required quality at the compressed mode transmission. Basic operations at the compressed mode transmission, such as following a change in the channel state, are the same as those at the normal mode transmission. However, at the compressed mode transmission, the receiver station does not receive a signal during the idle time in the compressed mode, and therefore, the receiver station cannot send a transmission power control command (TPC) to the transmitter station properly. This disables the transmission side to follow a change in the channel state, and when the transmission is resumed, a signal is sent on the transmission power immediately before shifting to the compressed mode as is shown in the drawing, thereby causing a "transmission power control error". Accordingly, in the conventional communication system, the transmission power control error caused by the compressed mode transmission is converged as soon as possible by employing a method of increasing the power amplitude Δ, for example. Hereinafter, a period since the transmission is resumed until the transmission power control error is converged (that is, a period until the reception power is restored in the vicinity of the target power) is referred to as a transmission power control convergence time.

Furthermore, in the conventional communication system, in order to achieve an interleave effect, the setting position of the idle time (non-transmission time) in the compressed mode is placed near the center of the frame formed by a plurality of slots as shown in FIG. 23, so that interleave is effected per base unit of a frame. In order to achieve a satisfactory interleave effect, it is more preferable to place the idle time near the center of the frame where bits within the frame can be dispersed with time than to place the idle time at the end of the frame to narrow the bits region after the interleave.

However, in the foregoing conventional communication system, a data volume within one frame is compensated with the actual transmitting time being compressed at the compressed mode transmission, and for this reason, a method of increasing a transmission rate by lowering the spreading factor or a method of increasing the transmission rate by reducing a coding rate is employed. Hence, as was discussed above as the prior art, in case that the idle time is placed near the center of the frame, slots with a lower spreading factor or slots with a reduced coding rate are placed in the transmission power control convergence time as shown in FIG. 23, which results in considerable deterioration in signal decoding accuracy. In short, the conventional communication system has a problem that adverse affect of the transmission power control error caused by the idle time is much greater than in the normal frame.

In addition, in the conventional communication system, in order to reduce the transmission power control error caused by the idle time, there has been proposed a method, in which the idle time is dispersed to more than one position so as to be placed discretely with time. However, according to the proposed method, each idle time is short, and when consideration is given to processing time or the like, there arises a problem that efficiency is reduced when observing the intensity of a different frequency carrier.

The present invention is devised to solve the above problems. It is an object of the present invention to obtain a communication system, a transmitter and a receiver, and a communication method capable of reducing adverse affect of the transmission power control error caused by the idle time without dispersing the idle time at the compressed mode transmission within a frame.

DISCLOSURE OF THE INVENTION

A communication system of the present invention, including a transmitter and a receiver both capable of operating in a normal mode or a compressed mode in which setting of a predetermined non-transmission time is allowed, the transmitter effecting transmission power control to a frame in each mode, wherein, when operating in the compressed mode, the transmitter changes a position of the non-transmission time in such a manner so as to minimize adverse affect of a transmission power control error that occurs after the non-transmission time.

According to the above-mentioned aspect, the position of the non-transmission time (idle time) in the compressed mode is changed in such a manner so as to minimize adverse affect of a transmission power control error that occurs after the non-transmission time, for example, with consideration given to the adverse affect of the transmission power control error and the interleave effect. Thus, different from the conventional method, it is not necessary to adapt a method of dispersing the non-transmission time at the compressed mode transmission within a frame.

According to the communication system of another aspect of the present invention, when the unit of interleaving is set to one frame, the transmitter places the non-transmission time in the compressed mode rearward from a center of a compressed frame.

According to the above-mentioned aspect, adverse affect of the transmission power control error is taken into consideration, and the position of the non-transmission time in the compressed mode is determined so as to be placed rearward from the center of the compressed frame, for example, thereby allowing observation of a different frequency carrier within the non-transmission time.

According to the communication system of another aspect of the present invention, the transmitter places data of at least one slot after the non-transmission time within the compressed frame, so that a satisfactory interleave effect is achieved.

According to the above-mentioned aspect, the position of the non-transmission time in the compressed mode is determined so as to be placed rearward from the center of the compressed frame, for example, with consideration given to the adverse affect of the transmission power control error and the interleave effect, and further, data of at least one slot is placed after the non-transmission time within the compressed frame, thereby allowing observation of a different frequency carrier within the non-transmission time.

According to the communication system of another aspect of the present invention, when the unit of interleaving is set to one frame and the non-transmission time extends over two frames, the transmitter places the non-transmission time in the compressed mode longer in a first frame and set relatively shorter in a second frame.

According to the above-mentioned aspect, the non-transmission time is set relatively longer in a first frame and set relatively shorter in a second frame, so that a satisfactory interleave effect can be achieved even when the non-transmission time extends over first and following second frames with consideration given to adverse affect of the transmission power control error to the second frame.

According to the communication system of another aspect of the present invention, the receiver estimates maximum Doppler frequency, compares the estimated maximum Doppler frequency with a preset threshold of the maximum Doppler frequency, and when the estimated maximum Doppler frequency is higher than the threshold, negotiates with the transmitter not to effect control as to a change of the position of the non-transmission time and when the estimated maximum Doppler frequency is lower than the threshold, the transmitter places the non-transmission time in the compressed mode rearward from the center of the compressed frame.

According to the above-mentioned aspect, the estimated value of the maximum Doppler frequency is compared with the preset threshold of the maximum Doppler frequency, and when a frequency of the estimated value is lower than the threshold, the non-transmission time is placed rearward in the compressed frame. On the other hand, when the frequency of the estimated value is higher than the threshold, negotiation is made so as not to adjust the non-transmission time, and the non-transmission time is placed near the center of the compressed frame. In other words, the position of the non-transmission time in the compressed frame is changed in response to the pitch of the fading frequency.

According to the communication system of another aspect of the present invention, the transmitter and receiver set a step size of power in transmission power control larger than a predetermined value set as a reference value through negotiation, and reduce a number of slots needed for the transmission power control error convergence that occurs after the non-transmission time.

According to the above-mentioned aspect, the step size of the transmission power control is determined in response to the fading frequency, and further, by estimating the transmission power control error convergence time based on the step size, the non-transmission time is set with consideration given to the adverse affect of the transmission power control error caused by the non-transmission time and the interleave effect.

According to the communication system of another aspect of the present invention, in an area where moving at a high speed is expected, the control as to a change of the position of the non-transmission time is not effected, and in an area where moving at a high speed is not expected, the non-transmission time in the compressed mode is placed rearward from the center of the compressed frame.

According to the above-mentioned aspect, by estimating the fading frequency based on the largeness of the cell radius, the non-transmission time is set with consideration given to the adverse affect of the transmission power control error caused by the non-transmission time and the interleave effect.

A transmitter of another aspect of the present invention for operating in a normal mode or a compressed mode in which setting of a predetermined non-transmission time is allowed and effecting transmission power control to a frame in each mode wherein, when operating in the compressed mode, changing a position of the non-transmission time in such a manner so as to minimize adverse affect of a transmission power control error that occurs after the non-transmission time.

According to the above-mentioned aspect, the position of the non-transmission time in the compressed mode is changed in such a manner so as to minimize the adverse affect of the transmission power control error that occurs after the non-transmission time, for example, with consideration given to the adverse affect of the transmission power control error and the interleave effect.

According to the transmitter of another aspect of the present invention, when the unit of interleaving is set to one frame, placing the non-transmission time in the compressed mode rearward from a center of a compressed frame.

According to the above-mentioned aspect, adverse affect of the transmission power control error is taken into consideration, and the position of the non-transmission time in the compressed mode is determined so as to be placed rearward from the center of the compressed frame, for example, thereby allowing observation of a different frequency carrier.

According to the transmitter of another aspect of the present invention, placing data of at least one slot after the non-transmission time within the compressed frame, so that a satisfactory interleave effect is achieved.

According to the above-mentioned aspect, the position of the non-transmission time in the compressed mode is determined so as to be placed rearward from the center of the compressed frame, for example, with consideration given to the adverse affect of the transmission power control error and the interleave effect, and further, data of at least one slot is placed after the non-transmission time within the compressed frame, thereby allowing observation of a different frequency carrier.

According to the transmitter of another aspect of the present invention, when the unit of interleaving is set to one frame and the non-transmission time extends over two frames, placing the non-transmission time in the compressed mode longer in a first frame and set relatively shorter in a second frame.

According to the above-mentioned aspect, the non-transmission time is set relatively longer in a first frame and set relatively shorter in a second frame, so that a satisfactory interleave effect can be achieved even when the non-transmission time extends over first and following second frames with consideration given to the adverse affect of the transmission power control error to the second frame.

According to the transmitter of another aspect of the present invention, through negotiation with a receiver, setting a step size of power in transmission power control larger than a predetermined value set as a reference value, and reducing a number of slots needed for the transmission power control error convergence that occurs after the non-transmission time.

According to the above-mentioned aspect, the step size of the transmission power control is determined in response to the fading frequency, and further, by estimating the transmission power control error convergence time based on the step size, the non-transmission time is set with consideration given to the adverse affect of the transmission power control error caused by the non-transmission time and the interleave effect.

A receiver of another aspect of the present invention estimates maximum Doppler frequency, compares the estimated maximum Doppler frequency with a preset threshold of the maximum Doppler frequency, and when the estimated maximum Doppler frequency is higher than the threshold, negotiates with a transmitter not to effect control as to a change of the position of the non-transmission time.

According to the above-mentioned aspect, the estimated value of the maximum Doppler frequency is compared with the preset threshold of the maximum Doppler frequency, and when a frequency of the estimated value is higher than the threshold, negotiation is made so as not to adjust the non-transmission time, and the non-transmission time is placed near the center of the compressed frame.

According to the receiver of another aspect of the present invention, through negotiation with a transmitter, setting a step size of power in transmission power control larger than a predetermined value set as a reference value, and reducing a number of slots necessary for a transmission power control error that occurs after the non-transmission time to converge.

According to the above-mentioned aspect, the step size of the transmission power control is determined in response to the fading frequency, and further, by estimating the transmission power control error convergence time based on the step size, the non-transmission time is set with consideration given to the adverse affect of the transmission power control error caused by the non-transmission time and the interleave effect.

A communication method of another aspect of the present invention comprises a transmission step and a reception step operating in a normal mode or a compressed mode in which setting of a predetermined non-transmission time is allowed, the transmission step including effecting of transmission power control, wherein, when operating in the compressed mode, a position of the non-transmission time is changed in the transmission step in such a manner so as to minimize adverse affect of a transmission power control error that occurs after the non-transmission time.

According to the above-mentioned aspect, the position of the non-transmission time in the compressed mode is changed in such a manner so as to minimize adverse affect of a transmission power control error that occurs after the non-transmission time, for example, with consideration given to the adverse affect of the transmission power control error and the interleave effect.

According to the communication method of another aspect of the present invention, when the unit of interleaving is set to one frame, in the transmission step, the non-transmission time in the compressed mode is placed rearward from a center of a compressed frame.

According to the above-mentioned aspect, adverse affect of the transmission power control error is taken into consideration, and the position of the non-transmission time in the compressed mode is determined so as to be placed rearward from the center of the compressed frame, for example, thereby allowing observation of a different frequency carrier.

According to the communication method of another aspect of the present invention, in the transmission step, data of at least one slot is placed after the non-transmission time within the compressed frame, so that a satisfactory interleave effect is achieved.

According to the above-mentioned aspect, the position of the non-transmission time in the compressed mode is determined so as to be placed rearward from the center of the compressed frame, for example, with consideration given to the adverse affect of the transmission power control error and the interleave effect, and further, data of at least one slot is placed after the non-transmission time within the compressed frame, thereby allowing observation of a different frequency carrier.

According to the communication method of another aspect of the present invention, when the unit of interleaving is set to one frame and the non-transmission time extends over two frames, in the transmission step, the non-transmission time in the compressed mode is set relatively longer in a first frame and set relatively shorter in a second frame.

According to the above-mentioned aspect, the non-transmission time is set relatively longer in a first frame and set relatively shorter in a second frame, so that a satisfactory interleave effect can be achieved even when the non-transmission time extends over first and following second frames with consideration given to adverse affect of the transmission power control error to the second frame.

According to the communication method of another aspect of the present invention, in the reception step, a maximum Doppler frequency is estimated, and the estimated maximum Doppler frequency is compared with a preset threshold of the maximum Doppler frequency, and when the estimated maximum Doppler frequency is higher than the threshold, a negotiation is made with a transmitter not to effect control as to a change of the position of the non-transmission time; and in the transmission step, when the frequency of the estimated maximum Doppler frequency is lower than the threshold, the non-transmission time in the compressed mode is placed rearward from the center of the compressed frame.

According to the above-mentioned aspect, the estimated value of the maximum Doppler frequency is compared with the preset threshold of the maximum Doppler frequency, and when a frequency of the estimated value is lower than the threshold, the non-transmission time is placed rearward in the compressed frame. On the other hand, when the frequency of the estimated value is higher than the threshold, negotiation is made so as not to adjust the non-transmission time, and the non-transmission time is placed near the center of the compressed frame.

According to the communication method of another aspect of the present invention, in the transmission step and reception step, a step size of power in transmission power control is set larger than a predetermined value set as a reference value through negotiation, and a number of slots needed for the transmission power control error convergence that occurs after the non-transmission time is reduced.

According to the above-mentioned aspect, the step size of the transmission power control is determined in response to the fading frequency, and further, by estimating the transmission power control error convergence time based on the step size, the non-transmission time is set with consideration given to the adverse affect of the transmission power control error caused by the non-transmission time and the interleave effect.

According to the communication method of another aspect of the present invention, in an area where moving at a high speed is expected, the control as to a change of the position of the non-transmission time is not effected, and in an area where moving at a high speed is not expected, the non-transmission time in the compressed mode is placed rearward from the center of the compressed frame.

According to the above-mentioned aspect, by estimating the fading frequency based on the largeness of the cell radius, the non-transmission time is set with consideration given to the adverse affect of the transmission power control error caused by the non-transmission time and the interleave effect.

BRIEF DESCRIPTION OF THE DRAWINGS

FIG. 18 is a view showing another optimal position of an idle time when the number of slots in a transmission power control error convergence time is reduced;

BEST MODE FOR CARRYING OUT THE INVENTION

Preferred embodiments of a communication system and a communication method of the present invention are described in detail below with reference to accompanying drawings. It should be appreciated, however, that the present invention is not limited to the embodiments described below.

Figure 1:
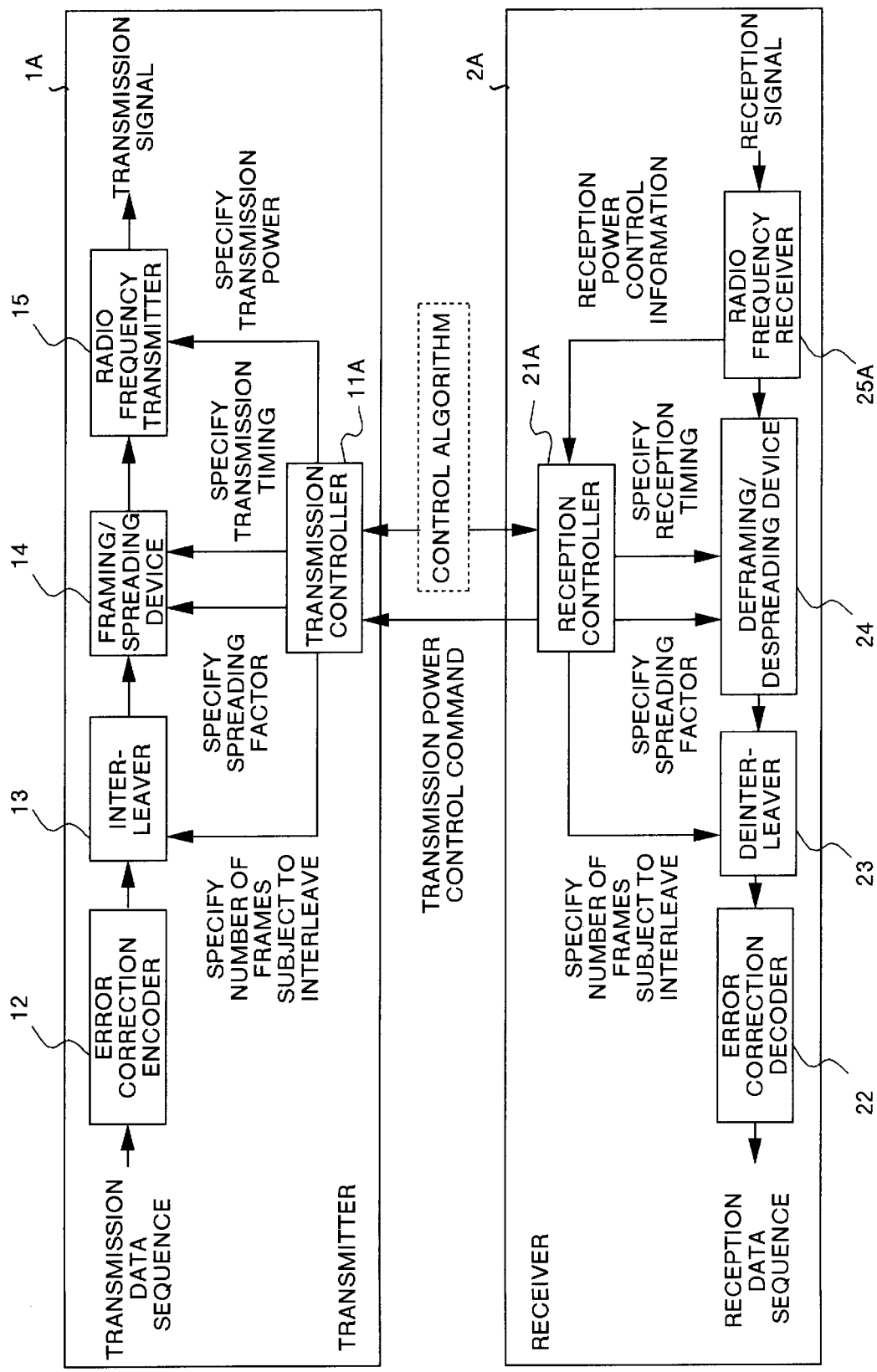
FIG. 1 is a view depicting an arrangement of a first embodiment of a communication system of the present invention.

FIG. 1 is a view depicting an arrangement of a first embodiment of the communication system of the present invention. In the present embodiment, the CDMA (Code Division Multiple Access) system will be explained as an example of the communication system. However, the communication system is not limited to the CDMA system, and can be any radio communication system (mobile communication, satellite communication, etc.) adapting the communication method of the present invention.

As shown in FIG. 1, the communication system of the present invention comprises a transmitter 1A and a receiver 2A. Such a transmitter 1A and receiver 2A are provided to the base station and each of the mobile station forming the system. The base station and each mobile station communicate wirelessly by means of the CDMA communication system.

Configuration of the transmitter 1A will be explained here. The transmitter 1A includes a transmission controller 11A, an error correction encoder 12, an interleaver 13, a framing/spreading device 14, and a radio frequency transmitter 15. The transmission controller 11A chiefly controls the operations of the interleaver 13, framing/spreading device 14, and radio frequency transmitter 15 through negotiation with the receiver 2A. For example, the transmission controller 11A specifies the number of frames subject to interleave in each of the normal mode (non-compressed mode) and compressed mode through negotiation with the receiver 2A. Also, in the compressed mode, the transmission controller 11A specifies a change of the spreading factor and transmission timing for transmitting a frame in the compressed mode to the framing/spreading device 14. Further, the transmission controller 11A directs the radio frequency transmitter 15A to increase/decrease transmission power.

The error correction encoder 12 generates coding data by effecting the error correction coding to a transmission data sequence. The interleaver 13 interleaves the time sequential orders per bit unit of the coding data, so that should sequential bits of a transmission signal be lost by fading during transmission (in case that a burst data error occurs), adverse affect of a transmission error can be minimized. The interleaver 13 can interleave more than one frame, and when specified the number of frames subject to interleave by the transmission controller 11A, the interleaver 13 effects the interleave to that number of frames.

The framing/spreading device 14 spreads the normal mode and compressed mode by using a user-specific spreading code into a broad band, and forms a frame suitable to each mode. When specified the transmission timing for each mode by the transmission controller 11A, the framing/spreading device 14 transmits the frame to the radio frequency transmitter 15 at that transmission timing. Further, when a change of the spreading factor is specified by the transmission controller 11A in the compressed mode, the framing/spreading device 14 generates a transmission signal by using a spreading factor lower than that in the normal mode as per instruction.

The radio frequency transmitter 15 converts the transmission signal obtained in the framing/spreading device 14 into a radio frequency and transmits the same. The radio frequency transmitter 15 outputs the transmission signal by increasing/decreasing the transmission power under the control of the transmission controller 11A. For example, the radio frequency transmitter 15 outputs the transmission signal in the compressed mode by increasing average transmission power from that in the normal mode.

Next, configuration of the receiver 2A will be explained. The receiver 2A includes a reception controller 21A, an error correction decoder 22, a deinterleaver 23, a deframing/despreading device 24, and a radio frequency receiver 25A. The reception controller 21A chiefly controls the operation of the deinterleaver 23 and deframing/despreading device 24 through negotiation with the transmitter 1A. For example, the reception controller 21A specifies the number of frames subject to deinterleave suitable in each of the normal mode and compressed mode through negotiation with the transmitter 1A. Also, in the compressed mode, the reception controller 21A specifies a change of the spreading factor and reception timing for receiving a frame in the compressed mode to the deframing/despreading device 24.

The radio frequency receiver 25A decodes a reception signal sent from an unillustrated antenna. The deframing/despreading device 24 generates a frame for each of the normal mode and compressed mode by means of despreading with a spreading code allocated to the user of the receiver 2A. Also, when specified the reception timing for each mode by the reception controller 21A, the deframing/despreading device 24 takes in the reception signal from the radio frequency receiver 25A at that reception timing. Further, when specified a change of the spreading factor by the reception controller 21A in the compressed mode, the deframing/despreading device 24 generates a reception signal by using a spreading factor lower than that in the normal mode as per instruction.

The deinterleaver 23 deinterleaves the time sequential orders per bit unit for the frame generated in the deframing/despreading device 24 in an inverse order in the interleaver 13 in the transmitter 1A. Like the interleaver 13, the deinterleaver 23 can also deinterleave more than one frame, and effects the deinterleave to that number of frames subject to deinterleave specified by the reception controller 21A. In addition, the error correction decoder 22 generates decoding data, that is, a reception data sequence, by effecting the error correction decoding to a signal to which the deinterleave has been effected.

Figure 2:
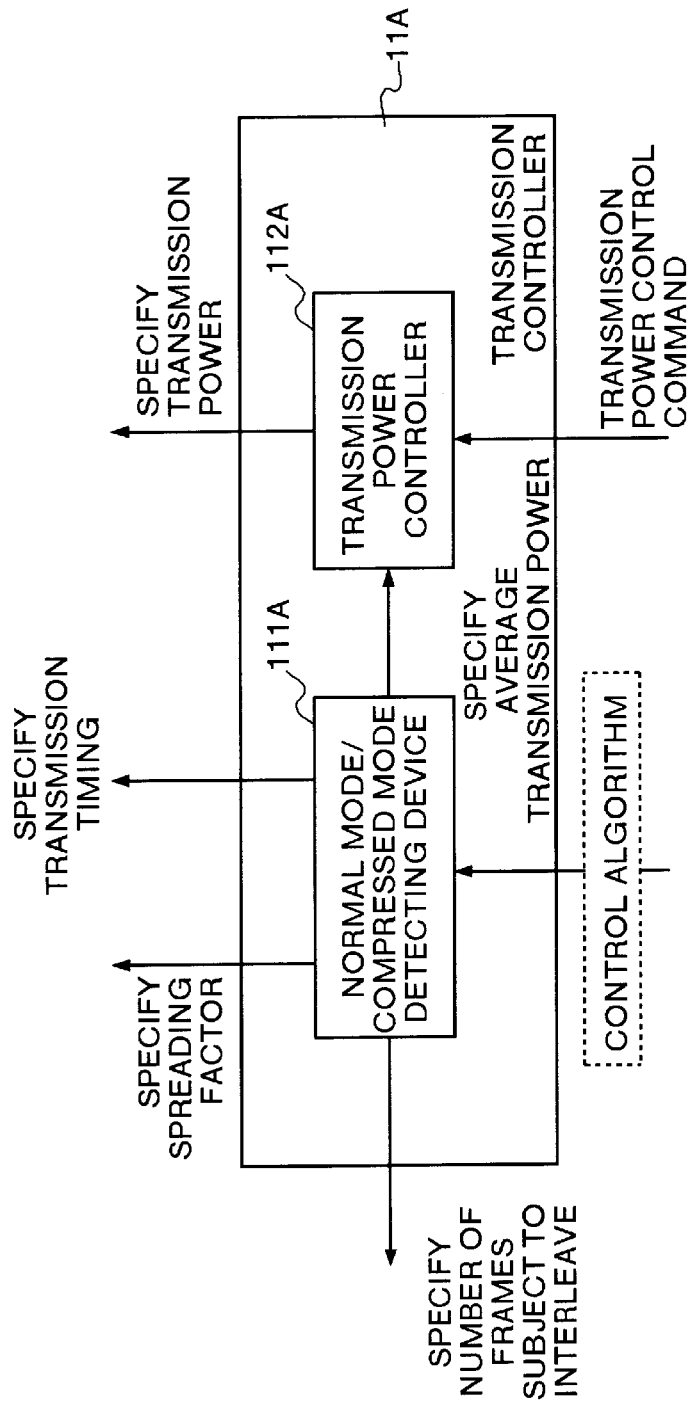
FIG. 2 is a view depicting an arrangement as to transmission power control by a transmission controller 11A in the first embodiment.

The transmission controller 11A and reception controller 21A operate in the following manner. FIG. 2 is a view depicting an arrangement as to transmission power control by the transmission controller 11A of the present embodiment. Legend 111A denotes a normal mode/compressed mode detecting device and legend 112A denotes a transmission power controller. The normal mode/compressed mode detecting device 111A determines timing at which the normal mode shifts to the compressed mode through negotiation with the receiver 2A, and specifies a change of the spreading factor and transmission timing to the framing/spreading device 14. Similarly, the normal mode/compressed mode detecting device 111A directs the transmission power controller 112A to increase average transmission power to suppress deterioration of a communication quality caused when compressing data in the compressed mode. When directed to increase the average transmission power, the transmission power controller 112A determines transmission power per slot unit based on the average transmission power and a transmission power control command (TPC command) from the receiver 2A, and specifies the determination result to the radio frequency transmitter 15.

Figure 3:
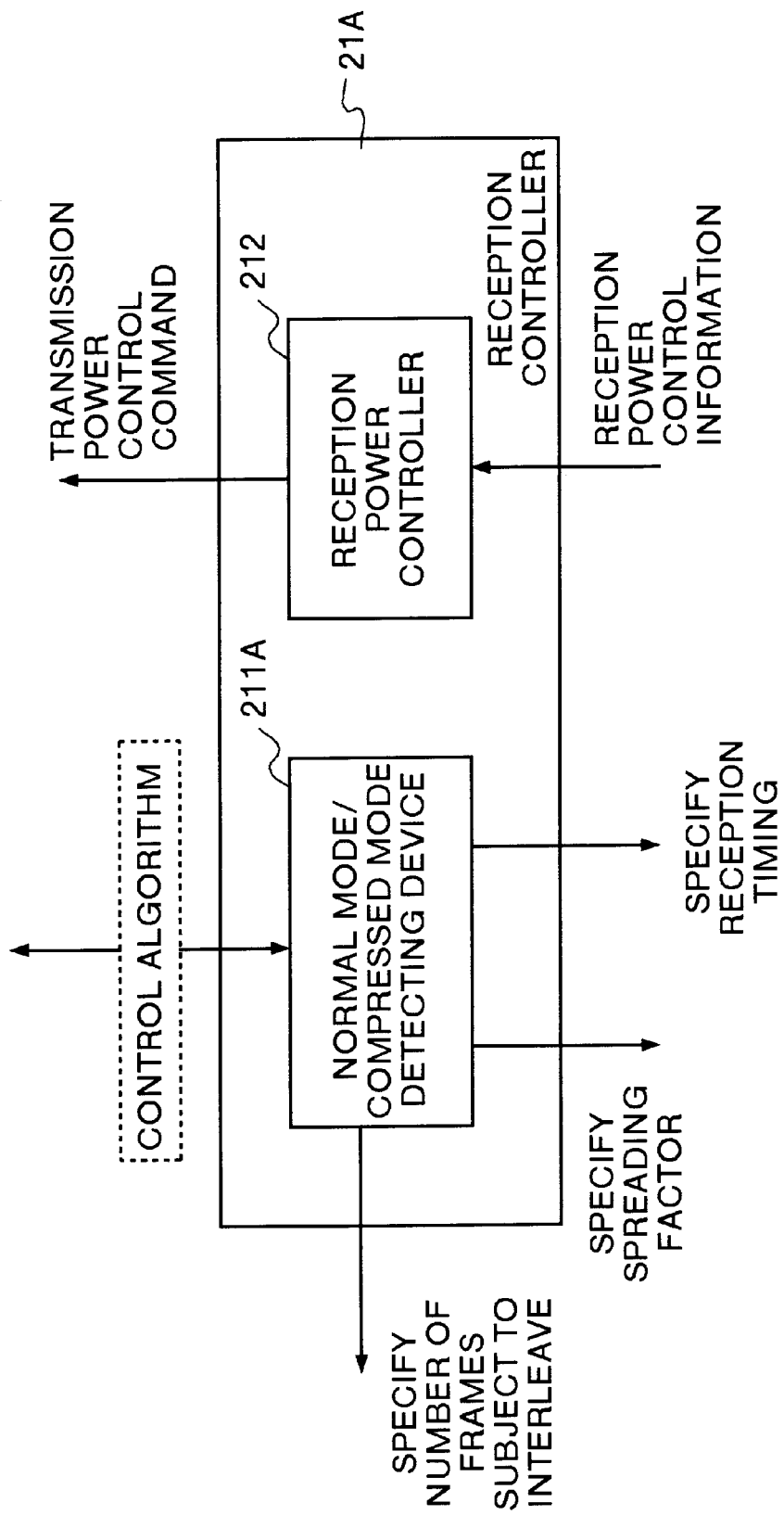
FIG. 3 is a view depicting an arrangement as to transmission power control by a reception controller 21A in the first embodiment.

FIG. 3 is a view depicting an arrangement as to transmission power control by the reception controller 21A of the present embodiment. Legend 211A denotes a normal mode/compressed mode detecting device and Numeral 212 denotes a reception power controller. The normal mode/compressed mode detecting device 211A determines timing at which the normal mode shifts to the compressed mode through negotiation with the transmitter 1A, and specifies a change of spreading factor and reception timing to the deframing/despreading device 24. In the normal mode and compressed mode, the reception power controller 212 compares the target power set so as to meet the required communication quality with power of the reception signal based on reception power control information notified by the radio frequency receiver 25B. When the latter is greater than the former, the reception power controller 212 notifies the transmitter 1A of a transmission power control command directing to lower the transmission power by predetermined power amplitude Δ. On the other hand, when the latter is smaller than the former, the reception power controller 212 notifies the transmitter 1A of a transmission power control command directing to increase the transmission power by predetermined power amplitude Δ.

Figure 4:
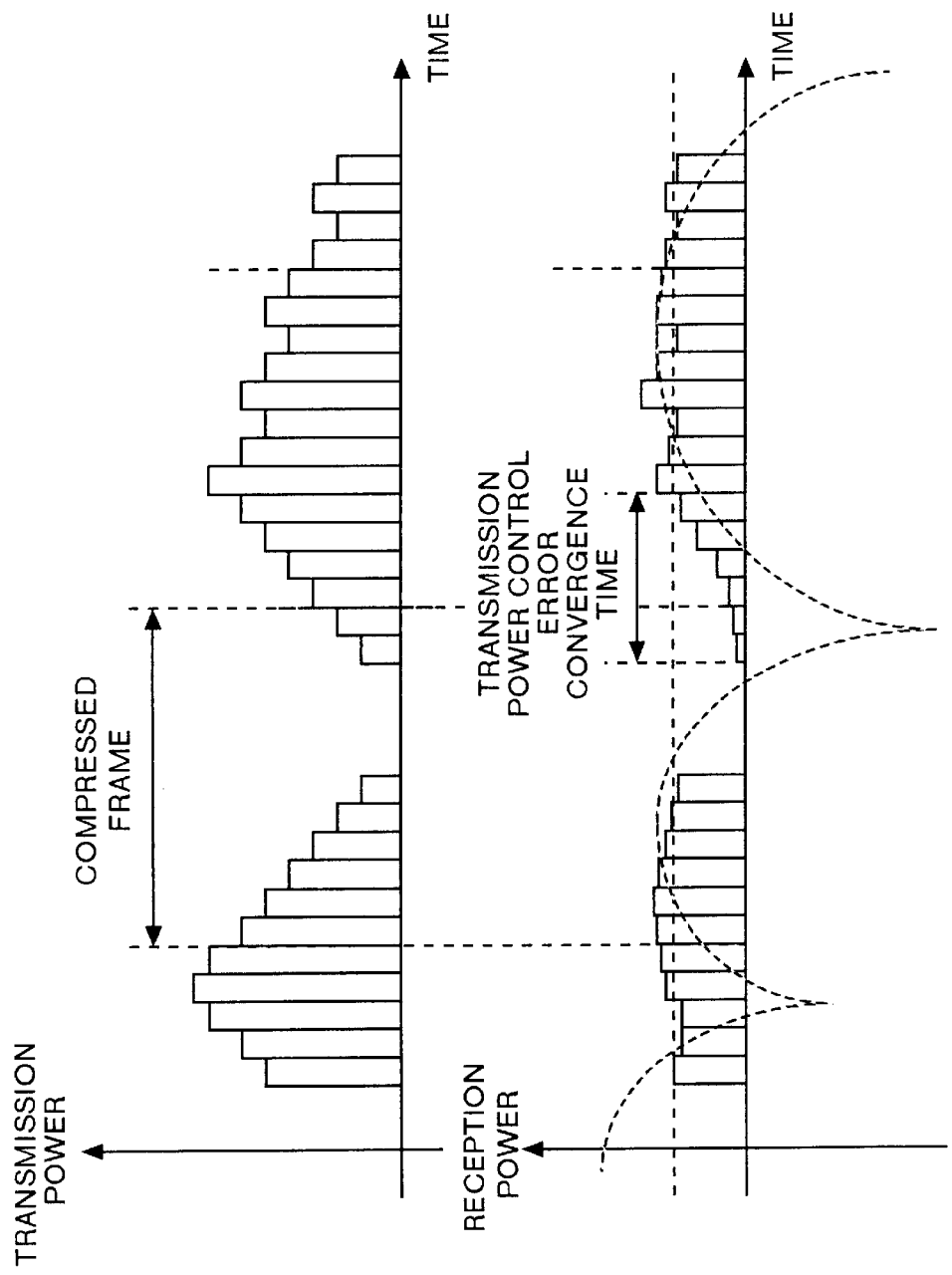
FIG. 4 is a view showing a setting position of an idle time at compressed mode transmission in the first embodiment.

Next, how and where (hereafter referred to as 'setting position') the ideal time is set will be explained. FIG. 4 is a view showing an example of the setting position of the idle time at the compressed mode transmission. Herein, one frame is given as an interleave unit. For example, in the compressed mode, because data is compressed for transmission, if the transmission power control error convergence time is the same, decoding characteristics are deteriorated more by adverse affect of the transmission power control error compared with the frame in the normal mode. For this reason, the normal mode/compressed mode detecting device 111A of the present embodiment controls the idle time to be placed rearward from the center of the compressed frame by specifying the transmission timing shown in FIG. 2. Upon receipt of the specification, the framing/spreading device 14 places the idle time at the desired position within the compressed frame.

If the number of slots after the idle time within the compressed frame decreases, so does the interleave effect within the compressed frame. Thus, in order to achieve a satisfactory interleave effect, at least one slot is set after the idle time within the compressed frame. In the present embodiment, because one frame is given as the interleave unit, the number of slots after the idle time within the compressed frame is set at least one. However, in case that the interleave unit extends over more than one frame, the number of slots after the idle time may be 0 (nil).

When the idle time is placed rearward from the center of the compressed frame as has been discussed, the number of slots after the idle time, that is, the number of slots given with a lowered spreading factor or the slots given with a reduced coding rate to be placed in the transmission power control convergence time, is smaller than the conventional number of slots. Accordingly, the signal decoding accuracy is upgraded significantly. In other words, in the communication system of the present embodiment, adverse affect of the transmission power control error caused by the idle time can be reduced markedly compared with the prior art. In addition, when the number of slots after the idle time within the compressed frame is set to one or more, the transmission power control convergence time is divided into the first and following second frames, that is, extends over two frames. Consequently, deterioration in decoding accuracy in the following second frame can be decreased.

When the number of slots after the idle time is set to 0 (nil), adverse affect of the transmission power control error is minimized. However, in this case, most of the slots are placed forward in the compressed frame, and there may be a case where a satisfactory interleave effect cannot be obtained. Thus, in the present embodiment, consideration is given to both the interleave effect and the adverse affect of the transmission power control error, and the idle time is placed rearward in the compressed frame and the number of slots after the idle time within the compressed frame is at least one.

Figure 5:
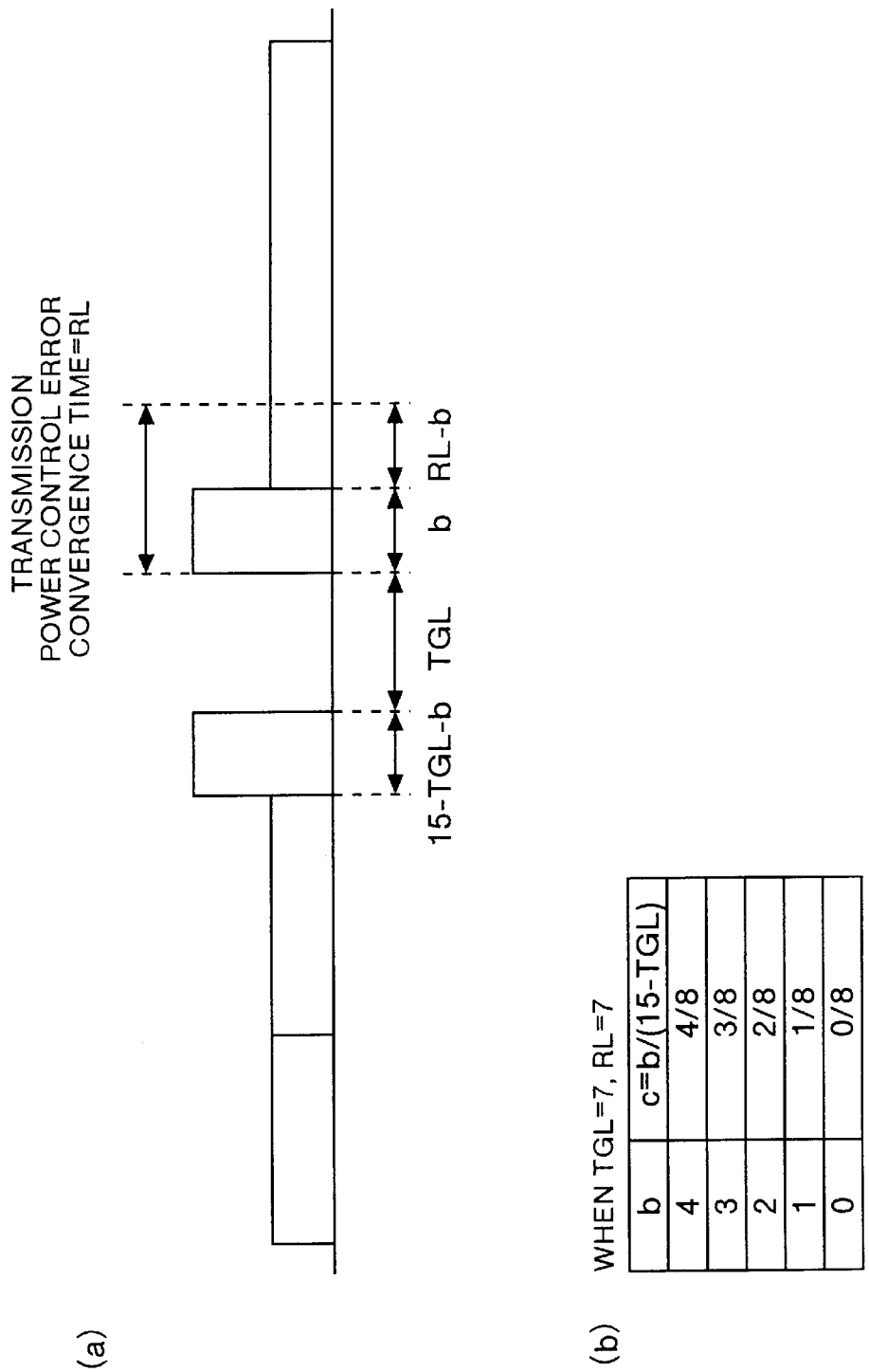
FIG. 5 is a view showing an optimal position of the idle time when consideration is given to adverse affect of a transmission power control error.

FIGS. 5(a) and 5(b) are views showing an optimal position of the idle time when consideration is given to adverse affect of the transmission power control error. In the present embodiment, the explanation is given for a case where one typical frame includes 15 slots for ease of explanation. TGL (transmission Gap Length) denotes the number of slots in the idle time in the compressed mode; a small letter b denotes the number of slots after the idle time in the compressed frame; 15-TGL-b denotes the number of slots before the idle time in the compressed frame; and RL (Recover Length) denotes the transmission power control error convergence time. In FIG. 5, 7 slots are given as the number TGL of idle slots in the compressed mode and also 7 slots are given as the transmission power control error convergence time RL.

For example, given TGL=7 in the idle time in the compressed mode, then the transmitter 1A has to transmit all the data (bits) in (15-TGL)=8 slots. Here, given RL=7 as the transmission power control error convergence time caused when adversely affected by the idle time, a ratio of being adversely affected by the transmission power control error when the number b of slots is varied (0 to 4), that is, a ratio c of the number of slots (b slots) after the idle time to the number of slots (8 slots) used in transmitting data, can be illustrated as FIG. 5. It is understood that the smaller the number b of the slots after the idle time, the less the adverse affect of the transmission power control error caused by the idle time become. However, in order to achieve a satisfactory interleave effect such that attains the error correction coding effect by randomizing errors that occur continuously, consideration has to be given to the number of slots after the idle time to some extent.

Figure 6:
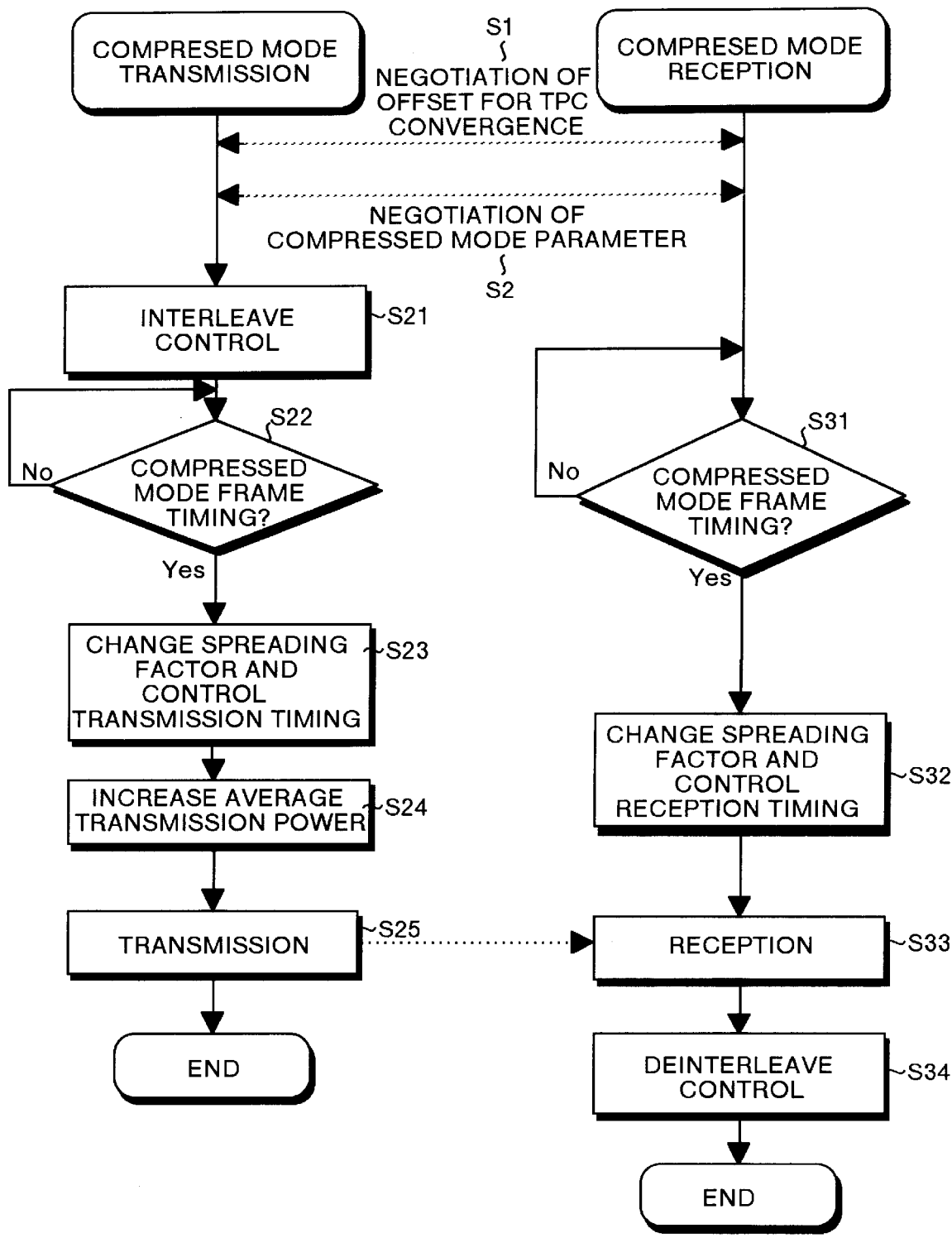
FIG. 6 shows a flowchart of the various steps in this communication method according to the first embodiment.

Next, a concrete example of the communication method between the transmitter 1A and receiver 2A will be explained. It is assumed that the idle time in the compressed mode is placed at the above-explained optimal position in the communication system shown in FIG. 1. FIG. 6 shows a flowchart of the various steps in this communication method.

To begin with, the transmission controller 11A in the transmitter 1A and the reception controller 21A in the receiver 1A determine the offset of frame timing for the transmission power control error convergence through negotiation at the normal mode transmission before the compressed mode transmission starts (Step S1). Then, the normal mode/compressed mode detecting device 111A and normal mode/compressed mode detecting device 211A determine the interleave method (the number of frames subject to interleave, etc.), transmission/reception timing related to the compressed frame, and parameters, such as spreading factor and average transmission power based on the idle time necessary to observe a different carrier frequency (Step S2). Then, the transmitter 1A and receiver 1B use the specified interleave method (Step S21) and carry out transmission/reception in the normal mode until the compressed frame timing thus determined comes (No in Step S22 and No in Step S31).

When the compressed frame timing comes under these conditions (Yes in Step S22 and Yes in Step S31), the transmission controller 11A in the transmitter 1A specifies a change of the spreading factor and transmission timing to the framing/spreading device 14. Then, upon receipt of these specifications, the framing/spreading device 14 generates, out of the data to which the interleave has been effected, a transmission data frame in which the idle time is placed rearward within the compressed frame (Step S23). Then, with the specified average transmission power under the control of the transmission controller 11A (Step S24), the radio frequency transmitter 15 outputs a transmission signal in the compressed mode (Step S25).

On the other hand, the reception controller 21A in the receiver 2A specifies a change of the spreading factor and reception timing to the deframing/despreading device 24 (Step S32). Upon receipt of these specifications, the deframing/despreading device 24 generates a reception data frame out of a reception signal received through the radio frequency receiver 25A (Step S33). Further, the deinterleaver 23 effects the deinterleave by a predetermined method (Step S34), whereby data with high decoding accuracy can be obtained as a result.

In this manner, in the present embodiment, consideration is given to the adverse affect of the transmission power control error and the interleave effect, and the position of the idle time in the compressed mode is determined so as to be placed rearward from the center of the compressed frame. Consequently, it is possible to prevent deterioration of the communication quality caused when observing a different frequency carrier.

As discussed above, in the present embodiment, by placing the idle time rearward from the center of the compressed frame by using the above method, it is possible to reduce the adverse affect of the transmission power control error caused by the idle time without dispersing the idle time within the frame at the compressed mode transmission as was in the conventional method. In the present embodiment, the position of the idle time was determined when one frame is given as an interleave unit. However, in case that more than one frame is given as the interleave unit, the position of the idle time in the compressed mode is also determined by giving consideration to the adverse affect of the transmission power control error and the interleave effect.

Figure 7:
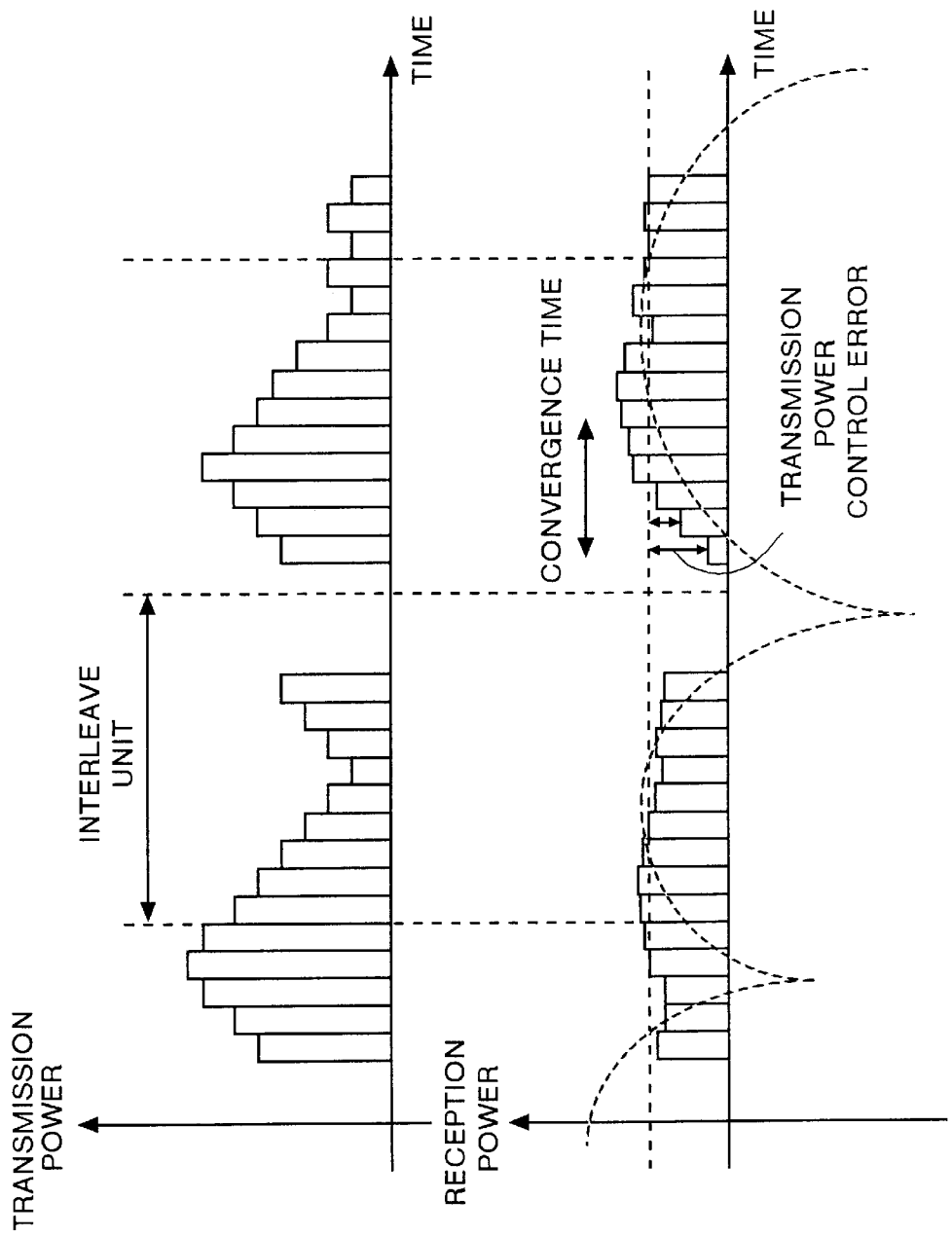
FIG. 7 is a view showing a setting position of an idle time at compressed mode transmission in a second embodiment.

FIG. 7 is a view showing a setting position of the idle time at the compressed mode transmission in a second embodiment. In the present embodiment, assume that the idle time in the compressed mode extends over two frames and one frame is given as the interleave unit. The arrangement of the communication system, arrangement of the transmission controller, and arrangement of the reception controller are identical with those explained in the first embodiment with reference to FIG. 1, FIG. 2, and FIG. 3. Thus, like components are labeled with like legends and the explanation of these components is not repeated for ease of explanation. Also, because the communication method in the compressed mode in the communication system of the present embodiment is identical with the one detailed with reference to the flowchart in FIG. 6, the explanation thereof is not repeated, either.

Figure 8:
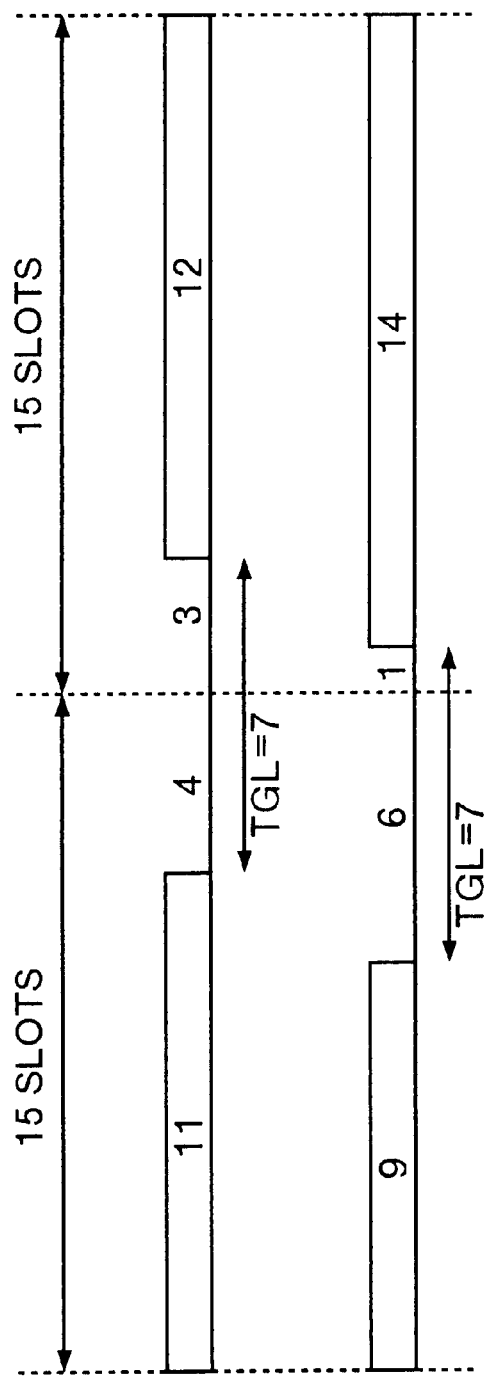
FIG. 8 is a view showing adverse affect of a transmission power control error that occurs after the idle time to a second frame.

For example, on the foregoing assumption, the transmission power control error after the idle time adversely affects only the second frame as shown in FIG. 7. More specifically, as shown in FIG. 8, given TGL=7, RL=4, and 30 slots as the compressed frame in which the idle time extends over two frames (when 15 slots are given as one frame in the normal mode), if the idle time is placed at the position (a), the adversely affect given to the second frame by the transmission power control error convergence time is 4 slots/12 slots. On the other hand, if the idle time is placed at the position (b), the adversely affect given to the second frame by the transmission power control error convergence time is 4 slots/14 slots.

Here, if the idle time extends over the first and following second frames, the normal mode/compressed mode detecting device 111A in the transmission controller 11A of the present embodiment considers the adverse affect of the transmission power control error to the second frame, and places the idle time more in the first frame and less in the following second frame, so that a satisfactory interleave effect can be achieved (see FIG. 7).

As has been discussed, in the present embodiment, even when the idle time extends over two frames, consideration is given to the adverse affect of the transmission power control error and the idle time is placed so that a satisfactory interleave effect is achieved in the second frame. Consequently, it is possible to suppress deterioration of the communication quality in the compressed mode.

Figure 9:
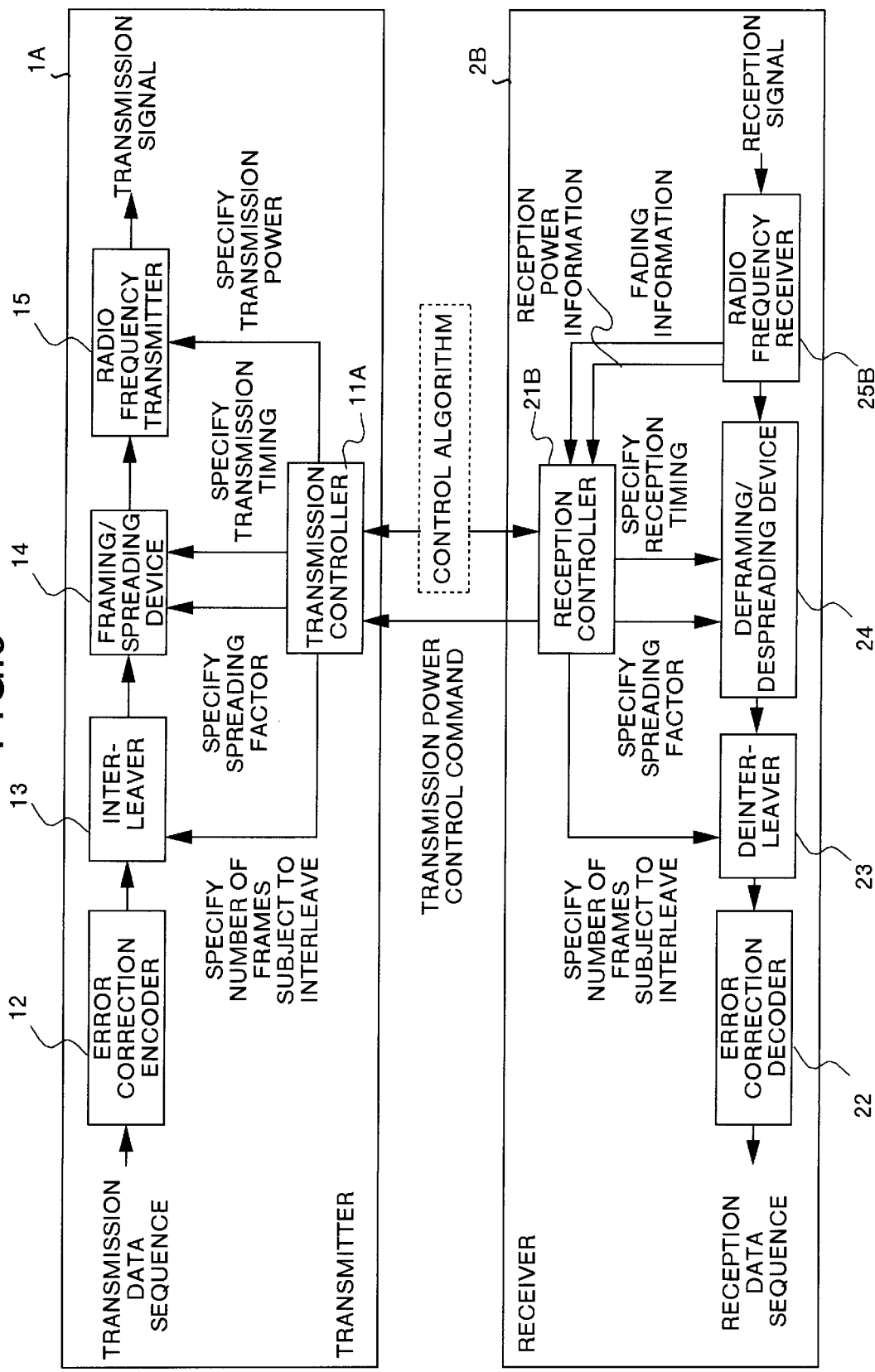
FIG. 9 is a view depicting an arrangement of a third embodiment of the communication system of the present invention.

FIG. 9 is a view depicting an arrangement of a third embodiment in the communication system of the present invention. In the present embodiment, like components with respect to the first embodiment discussed with reference to FIG. 1 are labeled with like legends, and the explanation of these components is not repeated for ease of explanation. Also, in the present embodiment, the CDMA system will be explained as an example of the communication system. However, the communication system is not limited to the CDMA system and can be any radio communication system (mobile communication, satellite communication, etc.) adapting the communication method of the present invention.

The communication system of the present invention comprises a transmitter 1A and a receiver 2B. The transmitter 1A and receiver 2B are provided to the base station and each mobile station forming the system. The base station and each mobile station communicate wirelessly by means of the CDMA communication system. The transmitter 1A is identical with its counterpart in the first embodiment, and the explanation thereof is not repeated herein for ease of explanation. The following description will describe the arrangement of the receiver 2B as to the difference from its counterpart in the first embodiment alone.

The receiver 2B includes a reception controller 21B, an error correction decoder 22, a deinterleaver 23, a deframing/despreading device 24, and a radio frequency receiver 25B. The reception controller 21B chiefly controls the operations of the deinterleaver 23 and deframing/despreading device 24 through negotiation with the transmitter 1A. The reception controller 21B specifies a change of the spreading factor and reception timing for receiving a compressed frame to the deframing/despreading device 24 in the compressed mode. Further, the reception controller 21B compares an estimated value of the maximum Doppler frequency (fading frequency) notified as fading information by the radio frequency receiver 25B with a preset threshold of the maximum Doppler frequency, and when a frequency of the estimated value is higher than the threshold, the reception controller 21B negotiates with the transmitter 1A not to control the position of the idle time, that is, to set the idle time near the center of the frame.

The radio frequency receiver 25B decodes a reception signal sent from an unillustrated antenna. The radio frequency receiver 25B estimates the maximum Doppler frequency based on the reception signal, and notifies the same to the reception controller 21B as the fading information.

Figure 10:
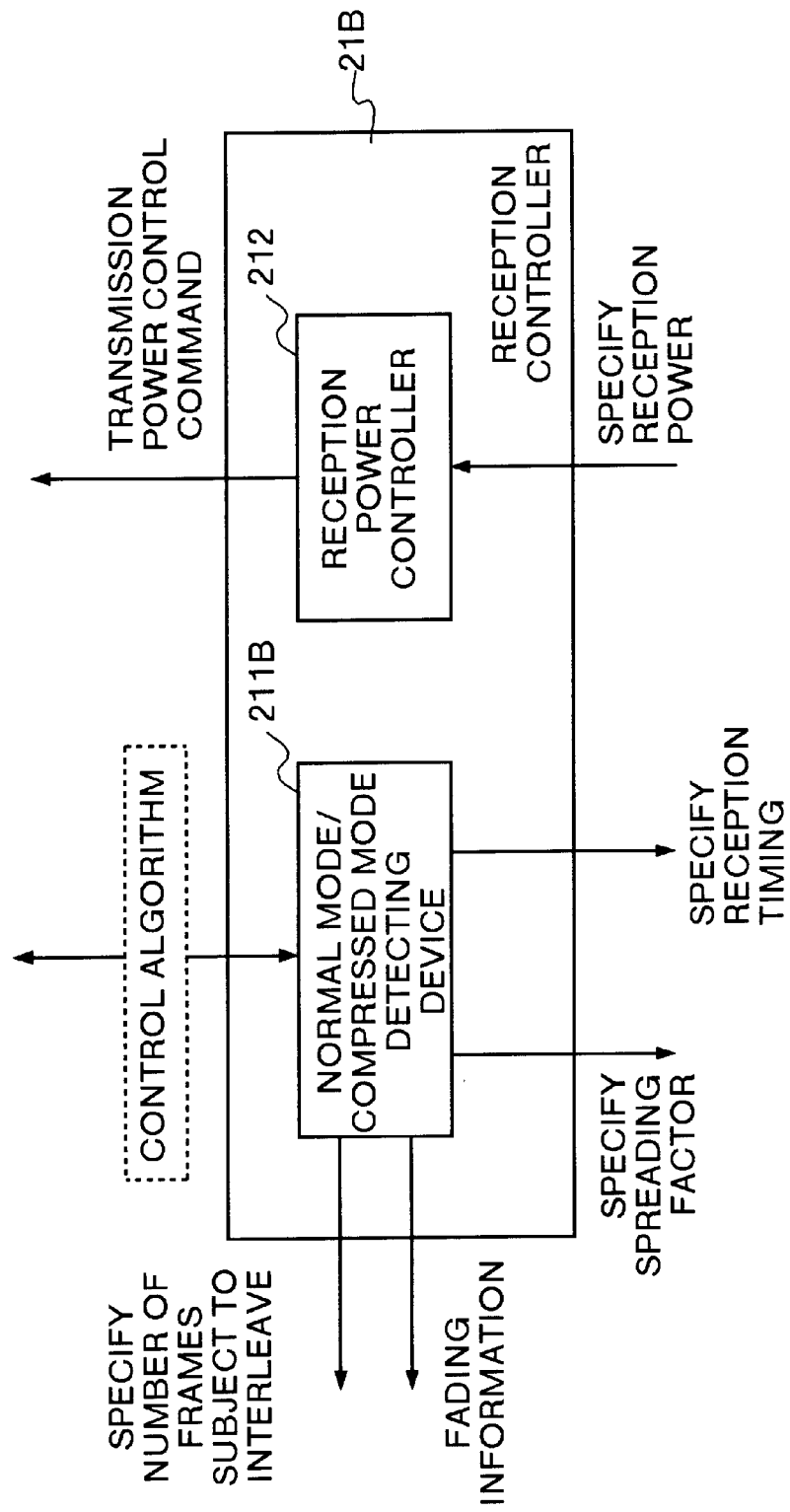
FIG. 10 is a view depicting an arrangement as to transmission power control by a reception controller 21B in the third embodiment.

The following description will describe operations of the reception controller 21B of the present embodiment as to differences from those of the reception controller 21A with reference to the accompanying drawings. FIG. 10 is a view depicting an arrangement as to transmission power control by the reception controller 21B of the present embodiment. Legend 211B denotes a normal mode/compressed mode detecting device. The normal mode/compressed mode detecting device 211B determines timing to shift to the compressed mode through negotiation with the transmitter 1A, and specifies a change of the spreading factor and reception timing to the deframing/despreading device 24. The normal mode/compressed mode detecting device 211B compares the fading information notified by the radio frequency receiver 25B with the preset threshold of the maximum Doppler frequency, and when a frequency of the estimated value related to the maximum Doppler frequency notified as the fading information is higher than the threshold, the normal mode/compressed mode detecting device 211B negotiates with the transmitter 1A not to adjust the idle time.

Figure 11:
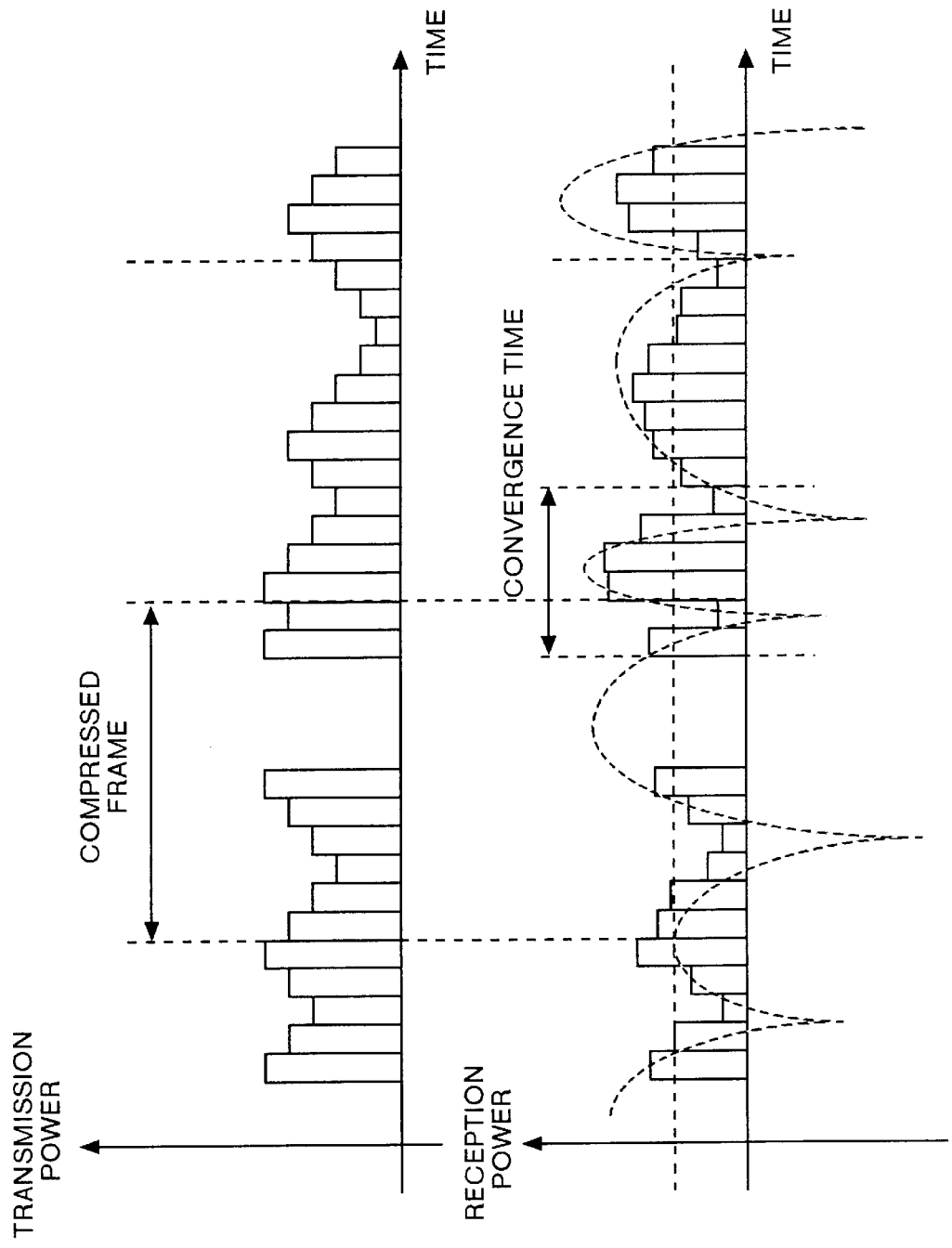
FIG. 11 is a view showing a setting position of an idle time at compressed mode transmission in the third embodiment (when the fading frequency is low)
Figure 12:
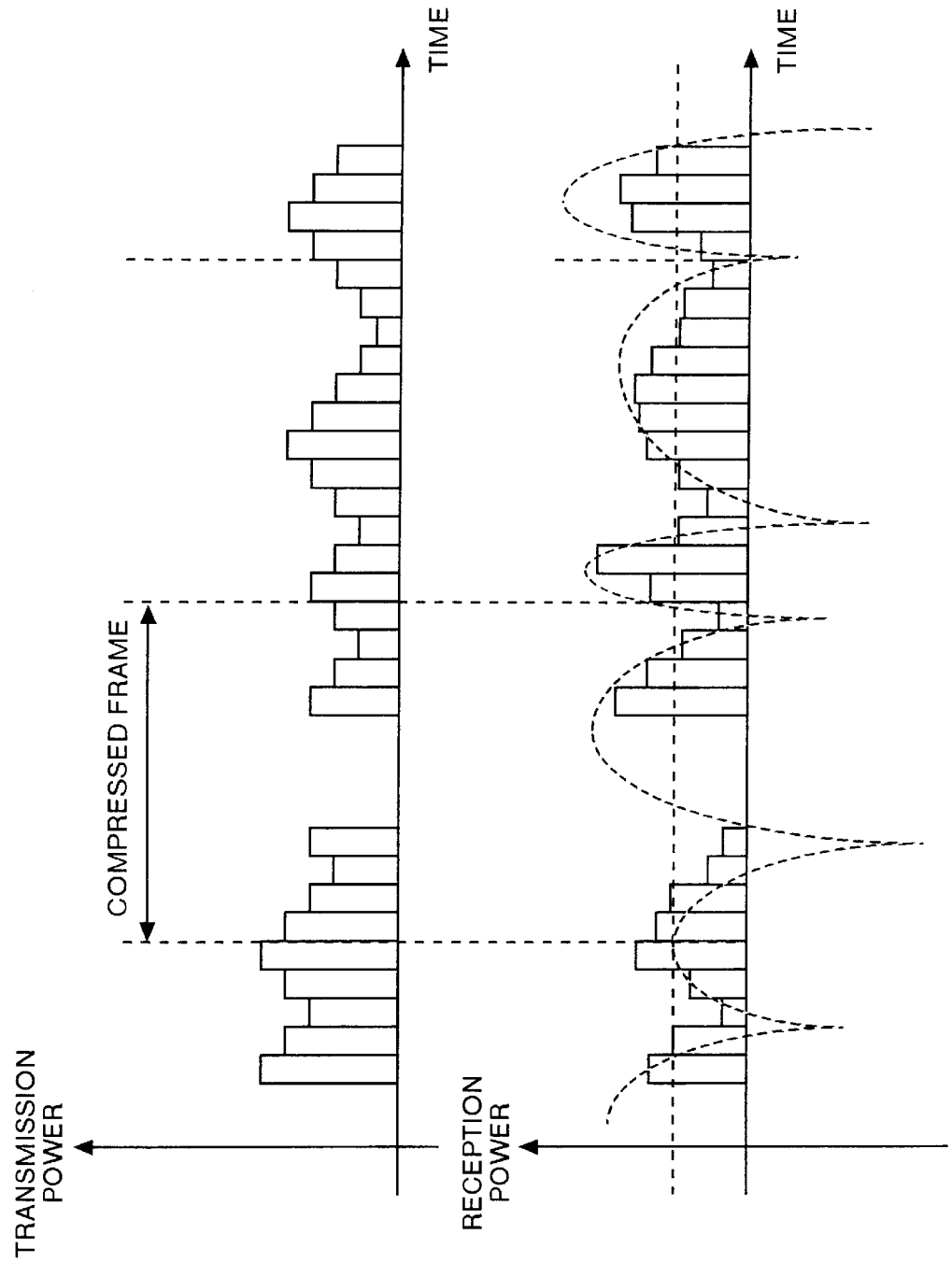
FIG. 12 is a view showing another setting position of an idle time at compressed mode transmission in the third embodiment (when the fading frequency is high)

Next, the following description will describe a setting position of the idle time at the compressed mode transmission in the present embodiment. FIGS. 11 and 12 are views showing an example of the setting position of the idle time at the compressed mode transmission. It should be noted that the present embodiment is applicable to a case where the maximum Doppler frequency is higher than that in the first embodiment.

For example, when the fading (the illustrated channel state) is high, a relatively short time is given as a time interval during which the reception power drops, thereby dispersing the occurrence of errors with time. Hence, the effect of improving the communication quality by means of the transmission power control is reduced with deterioration following the channel state, and conversely, the effect of improving the communication quality by means of the error correction coding/interleave is increased. Therefore, for example, when the fading frequency is high, if the idle time is placed rearward in the compressed frame in the same manner as the first embodiment, the compressed data bits are distributed unevenly forward within the compressed frame, thereby possibly impairing the randomizing effect attained by means of interleave.

Accordingly, in the present embodiment, the reception controller 21B compares the fading information notified by the radio frequency receiver 25B with the preset threshold of the maximum Doppler frequency, and when a frequency of the estimated value of the maximum Doppler frequency notified as the fading information is lower than the threshold, as is shown in FIG. 11, the reception controller 21B places the idle time rearward in the compressed frame in the same manner as the first embodiment.

On the other hand, when the reception controller 21B compares the fading information notified by the radio frequency receiver 25B with the preset threshold of the maximum Doppler frequency and a frequency of the estimated value of the maximum Doppler frequency notified as the fading information is higher than the threshold, the reception controller 21B negotiates with the transmitter 11A not to adjust the idle time, so that, as is shown in FIG. 12, the idle time is placed near the center of the compressed frame.

In this manner, by changing the position of the idle time in the compressed frame in response to the pitch of the fading frequency, it is possible to effect the control such that does not deteriorate the interleave effect when the fading frequency is high and the transmission power control effect when the fading frequency is low. In addition, for example, a similar effect can be achieved by placing the idle time rearward in the compressed frame in the same manner as the first embodiment in an area where moving at a high speed is not expected (when the fading frequency is low), and by placing the idle time near the center of the compressed frame when moving at a high speed is expected (when the fading frequency is high).

Figure 13:
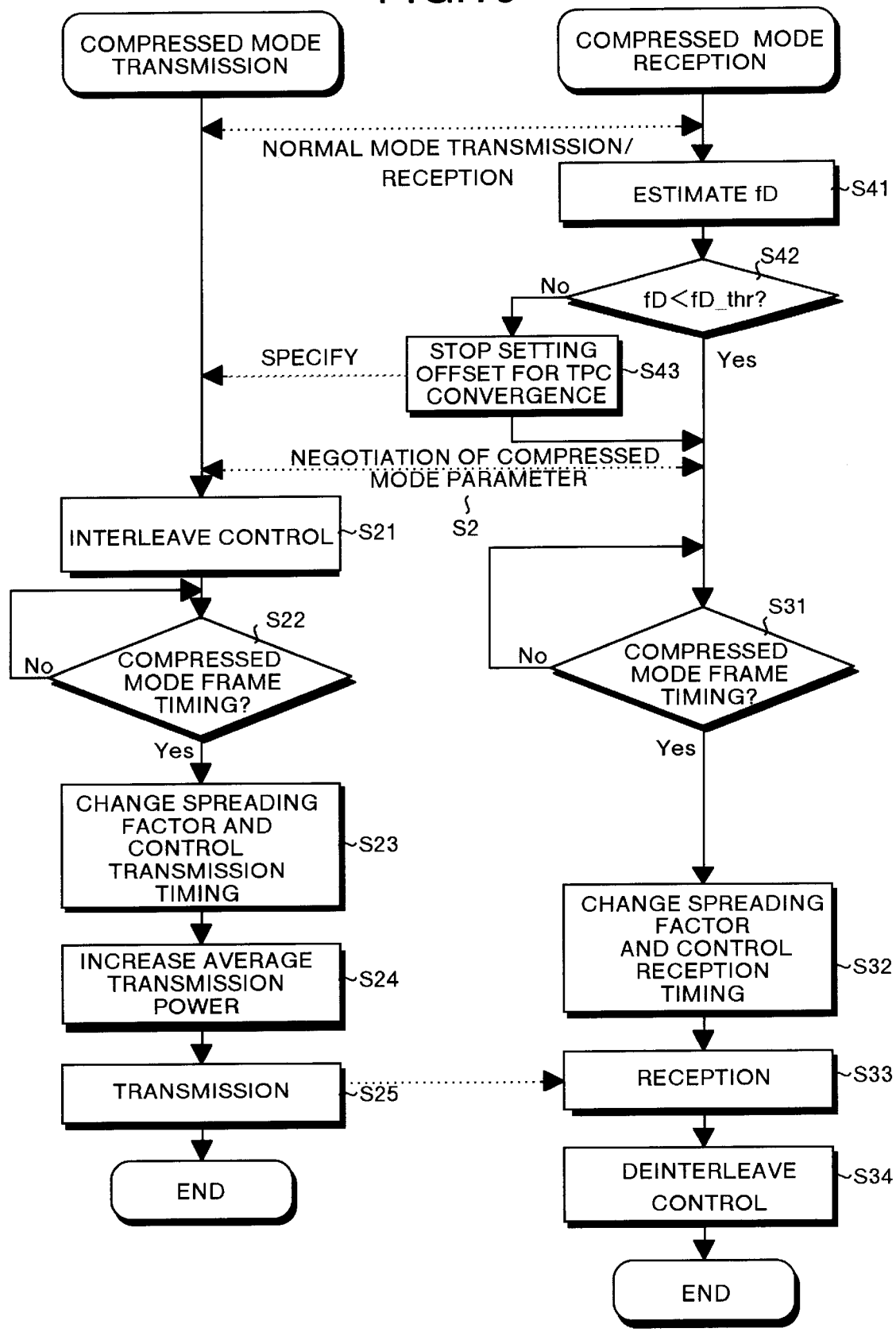
FIG. 13 shows a flowchart of the various steps in this communication method according to the third embodiment.

Next, a concrete example of the communication method between the transmitter 1A and receiver 2B will be explained. It is assumed that the idle time in the compressed mode is placed at the above-explained optimal position in the communication system shown in FIG. 8. FIG. 13 shows a flowchart of the various steps in this communication method. The steps same as those in the above-described first embodiment are labeled with like step numbers, and the explanation of these steps is not repeated for ease of explanation.

To begin with, at the normal mode transmission before shifting to the compressed mode transmission, the radio frequency receiver 25B in the receiver 2B estimates the maximum Doppler frequency based on the received reception signal, and notifies the same to the reception controller 21B as the fading information (Step S41). Upon receipt of the fading information, the reception controller 21B compares the fading information with the preset threshold of the maximum Doppler frequency, and when a frequency of the estimated value is higher than the threshold (No in Step S42), the reception controller 21B stops the setting of the offset of the idle time fot the transmission power control error convergance (Step S43), and places the idle time near the center of the compressed frame. When the frequency of the estimated value of the frequency is lower than the threshold (Yes in Step S42), the reception controller 21B places the idle time rearward in the compressed frame in the same manner as the first embodiment in the following steps.

As discussed above, in the present embodiment, a similar effect as that in the first embodiment can be achieved. Further, by changing the position of the idle time in the compressed frame in response to the pitch of the fading frequency, it is possible to effect the control such that does deteriorate the interleave effect when the fading frequency is high and the transmission power control effect when the fading frequency is low.

The maximum Doppler frequency is not necessarily estimated by measuring the reception signal. For example, in the cellular communication, a large radius is given to the cells that provide a communication service by the base location for the service to a mobile station having a higher moving rate, such as use in an automobile or a train, whereas a smaller radius is given to the cells that provide a service to a quasi-station mobile station in use at a walking pace or in a semi-fixed station. Thus, in general, it can be said that when the cell radius is large, the fading frequency is high, and when the cell radius is small, the fading frequency is low. Hence, in this case, a similar effect can be achieved by estimating the Doppler frequency (fading frequency) based on the largeness of the cell radius and carrying out the above control.

Figure 14:
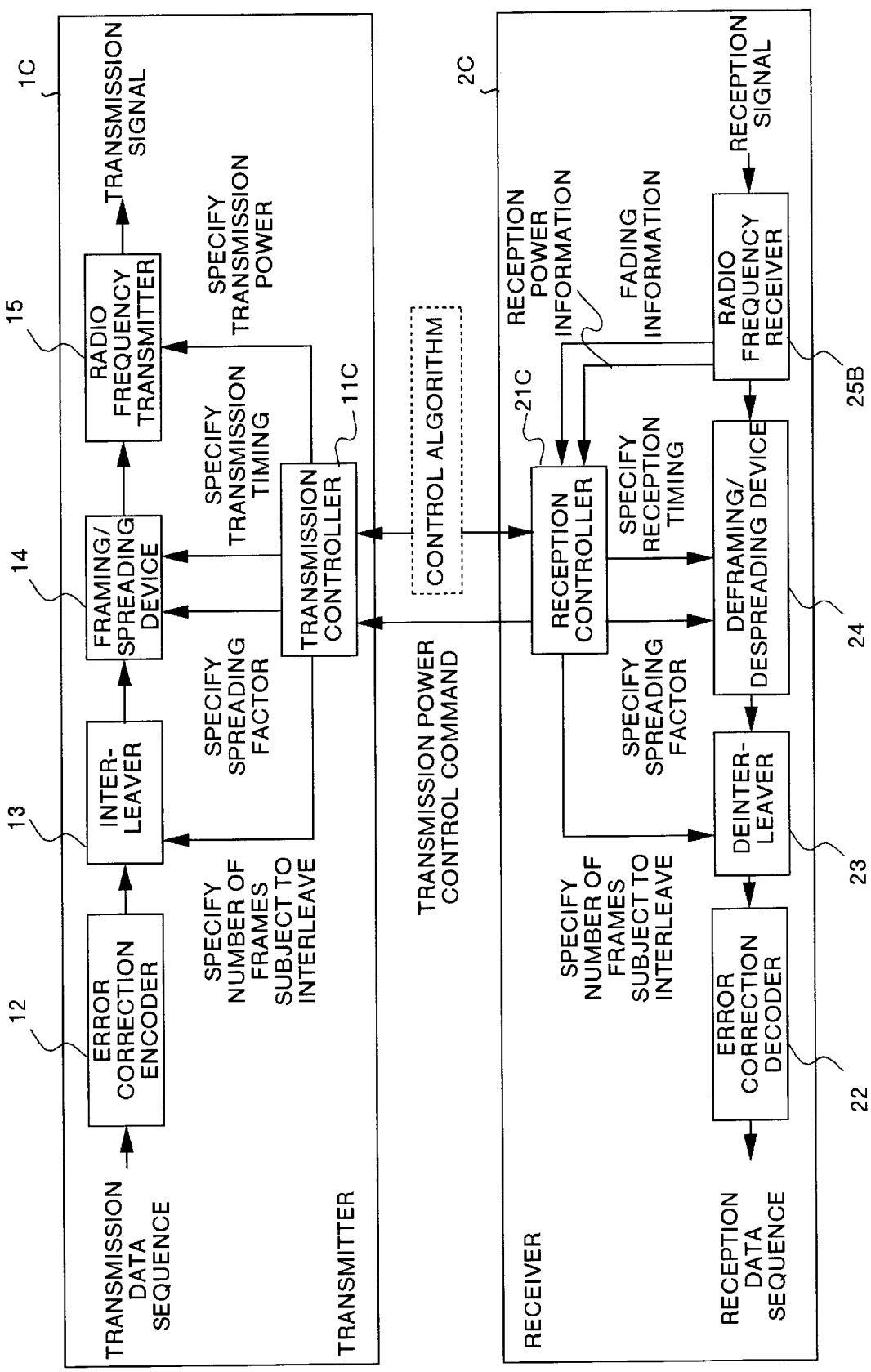
FIG. 14 is a view depicting an arrangement of a fourth embodiment of the communication system of the present invention.

FIG. 14 is a view depicting an arrangement of a fourth embodiment of the communication system of the present invention. In the present embodiment, the components identical with those explained in the first embodiment with reference to FIG. 1 and those explained in the second embodiment with reference to FIG. 9 are labeled with like legends, and explanation of these components is not repeated for ease of explanation. In the present embodiment also the CDMA system will be explained as an example of the communication system. However, the communication system is not limited to the CDMA system, and can be any radio communication system (mobile communication, satellite communication, etc.) adapting the communication method of the present invention.

As shown in FIG. 14, the communication system of the present invention comprises a transmitter 1C and a receiver 2C. The transmitter 1C and receiver 2C are provided to the base station and each mobile station forming the system, and the base station and each mobile station communicate wirelessly by means of the CDMA communication system. Herein, the explanation of the transmitter 1C and receiver 2C will be given as to the differences from their counterparts in the first and second embodiments alone.

To begin with, the transmitter 1C forming the communication system will be explained. In FIG. 14, the transmitter 1C includes a transmission controller 11C, an error correction encoder 12, an interleaver 13, a framing/spreading device 14, and a radio frequency transmitter 15.

Figure 15:
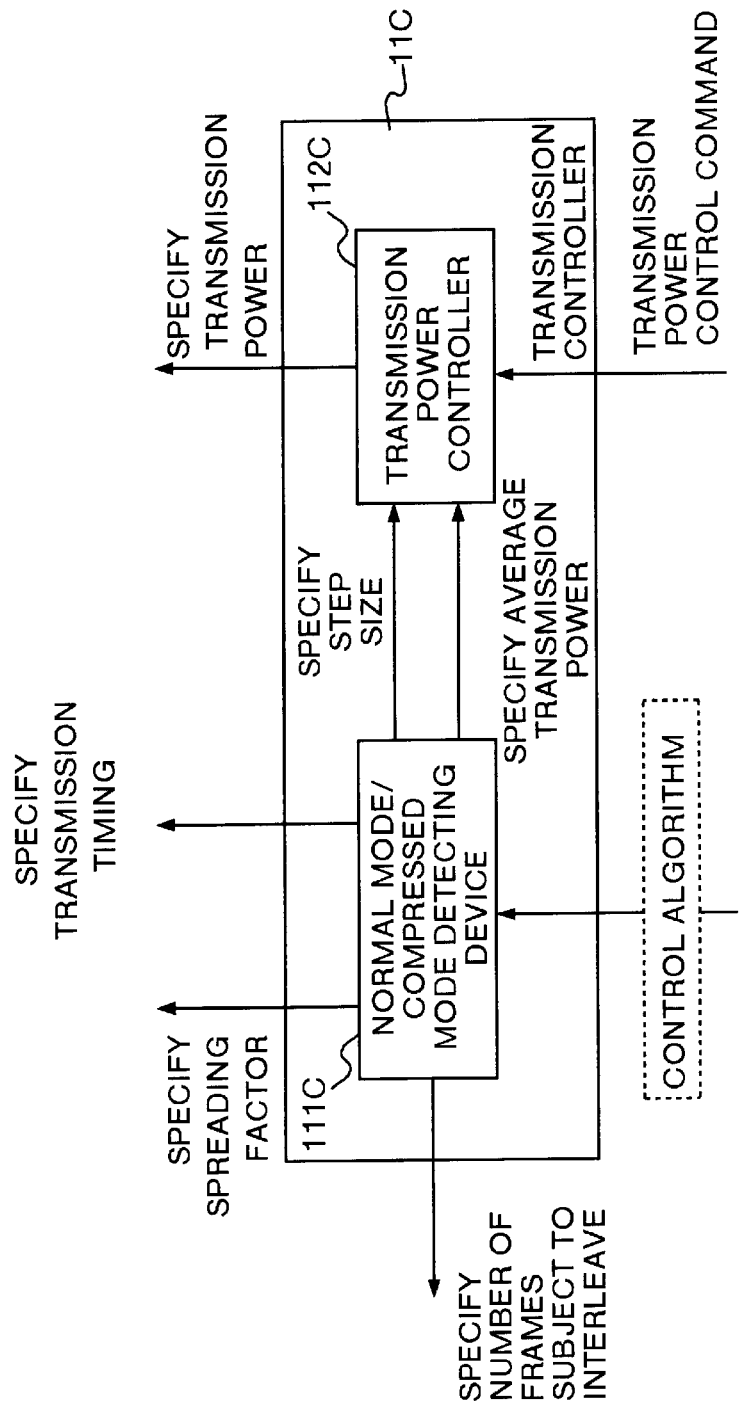
FIG. 15 is a view depicting an arrangement as to transmission power control by a transmission controller 11C in the fourth embodiment.

FIG. 15 is a view depicting an arrangement as to the transmission control by the transmission controller 11C of the present embodiment. Legend 111C denotes a normal mode/compressed mode detecting device, and legend 112C denotes a transmission power controller. The normal mode/compressed mode detecting device 111C negotiates with the receiver 2C based on the fading information notified by the receiver 2C to determine a transmission power control step size, and notifies a step size specifying signal to the transmission power controller 112C. At the same time, the normal mode/compressed mode detecting device 111C estimates a convergence time for a transmission power control error that occurs after the idle time in the compressed mode based on the fading information and transmission power control step size. Then, with the consideration given to the adverse affect of the transmission power control error and the interleave effect, the normal mode/compressed mode detecting device 111C determines the position of the idle time. The other operations of the normal mode/compressed mode detecting device 111C are the same as those explained in the first embodiment.

The transmission power controller 112C controls power amplitude in the transmission power control in accordance with the step size specifying signal sent from the normal mode/compressed mode detecting device 111C. The other operations of the transmission power controller 112C are the same as those explained in the first embodiment.

Next, configuration of the receiver 2C forming the communication system will be explained. The receiver 2C includes a reception controller 21C, an error correction decoder 22, a deinterleaver 23, a deframing/despreading device 24, and a radio frequency receiver 25B.

The reception controller 21C chiefly controls the operations of the deinterleaver 23 and deframing/despreading device 24 through negotiation with the transmitter 1C. The reception controller 21C specifies a change of the spreading factor and reception timing for receiving a compressed frame to the deframing/despreading device 24 in the compressed mode. Further, the reception controller 21C notifies an estimated value of the maximum Doppler frequency notified as the fading information by the radio frequency receiver 25B to the receiver 1C, and estimates a transmission power control error convergence time through negotiation with the transmitter 1C to determine the transmission power control step size and an offset quantity of the idle time.

Figure 16:
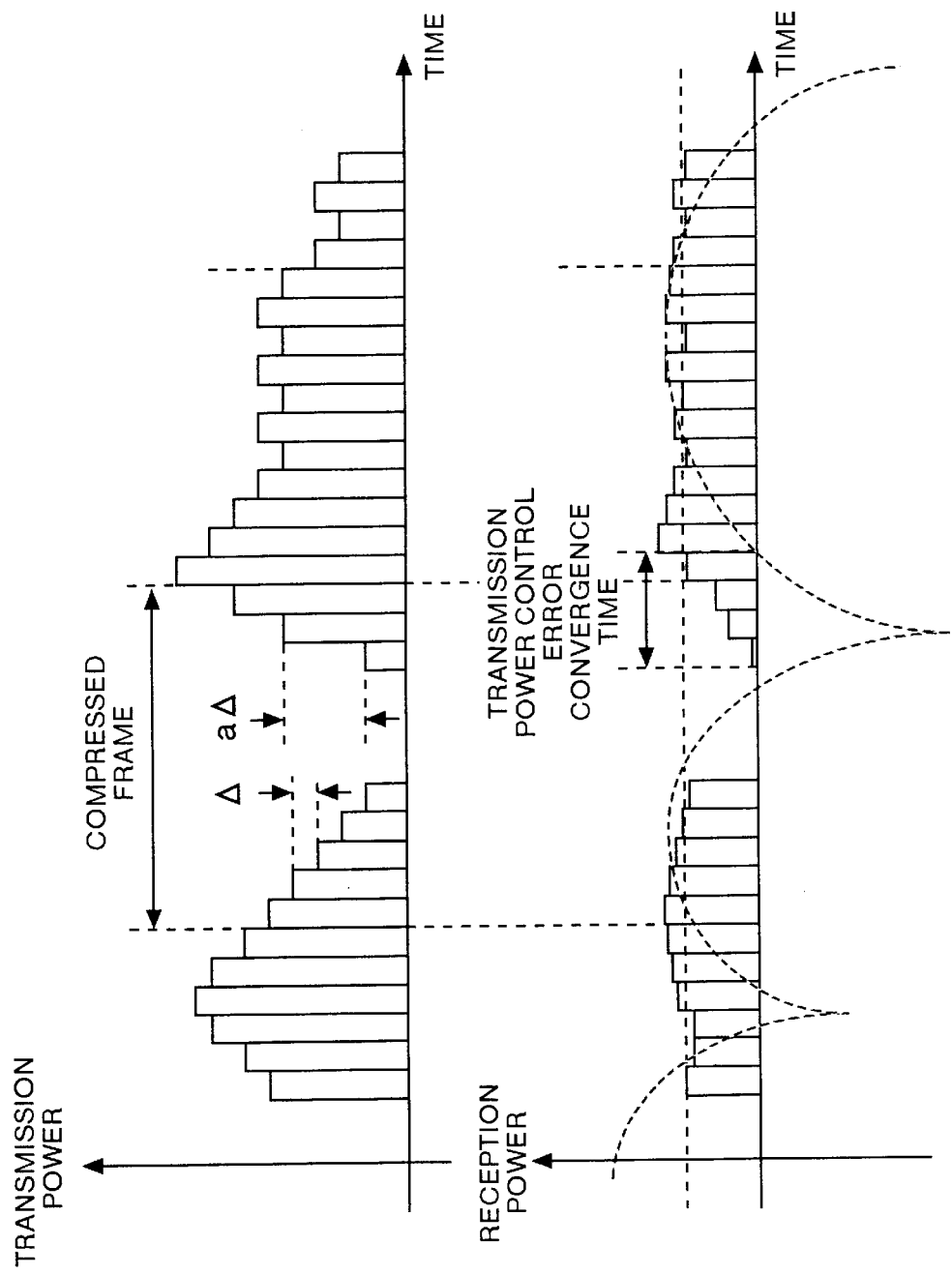
FIG. 16 is a view showing a setting position of an idle time at compressed mode transmission in the fourth embodiment.
Figure 17:
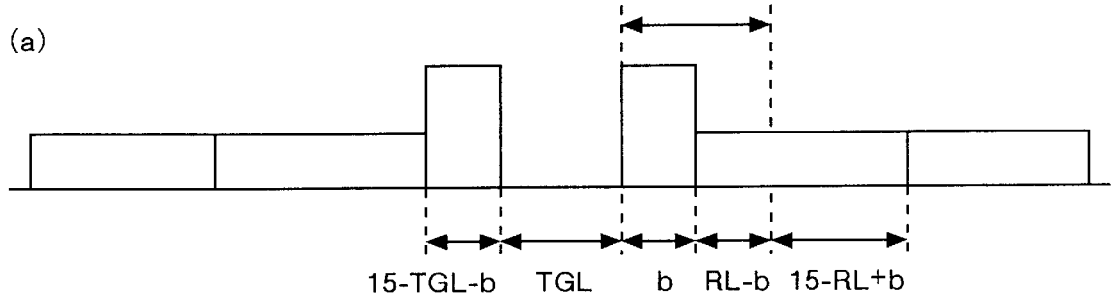
FIG. 17 is a view showing an optimal position of an idle time when the number of slots in a transmission power control error convergence time is reduced.

FIG. 16 is a view showing an example of the setting position of the idle time at the compressed mode transmission and the transmission control step size set by the foregoing operations. In FIG. 16, Δ denotes the step size before the idle time in the compressed frame, and a Δ (a>1) denotes the step size after the idle time. For example, in the present embodiment, by setting the transmission control step size larger than that in the first embodiment, the number of the slots necessary to converge the transmission power control error that occurs after the idle time is reduced.

FIGS. 17(a) to 17(e) and FIGS. 18(a) to 18(c) are views showing an optimal position of the idle time in the compressed mode when the number of the slots in the transmission power control error convergence time after the idle time is reduced by changing the transmission control step size by the foregoing operations. These drawings reveal that the smaller the number b of the slots after the idle time, the less the adverse affect of the transmission power control error caused by the idle time. It should be noted, however, that, in order to achieve a satisfactory interleave effect that attains the error correction coding effect by randomizing errors that occur continuously, consideration has to be given to the number of slots after the idle time to some extent.

Figure 19:
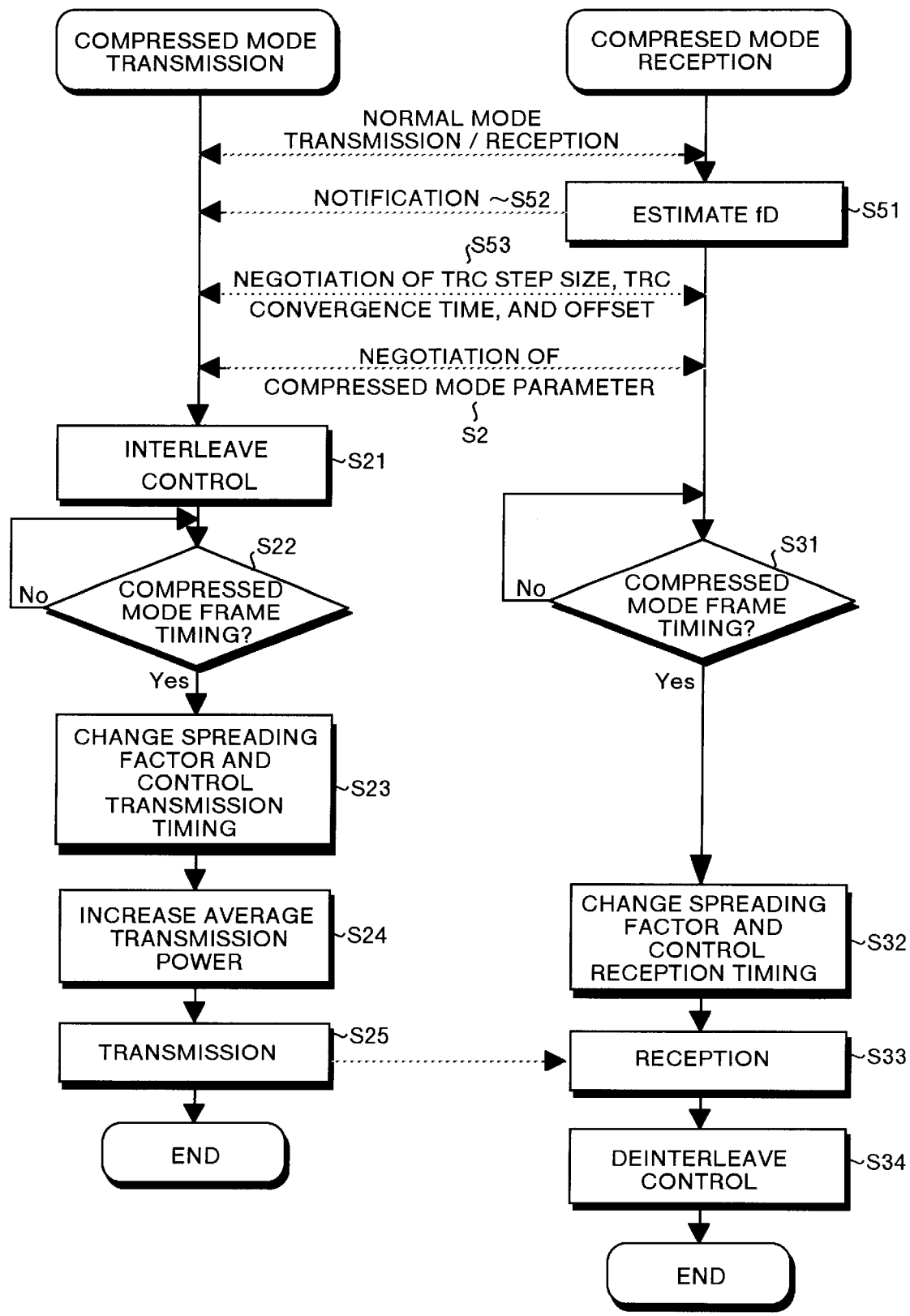
FIG. 19 shows a flowchart of the various steps in this communication method according to the fourth embodiment.
Figure 20:
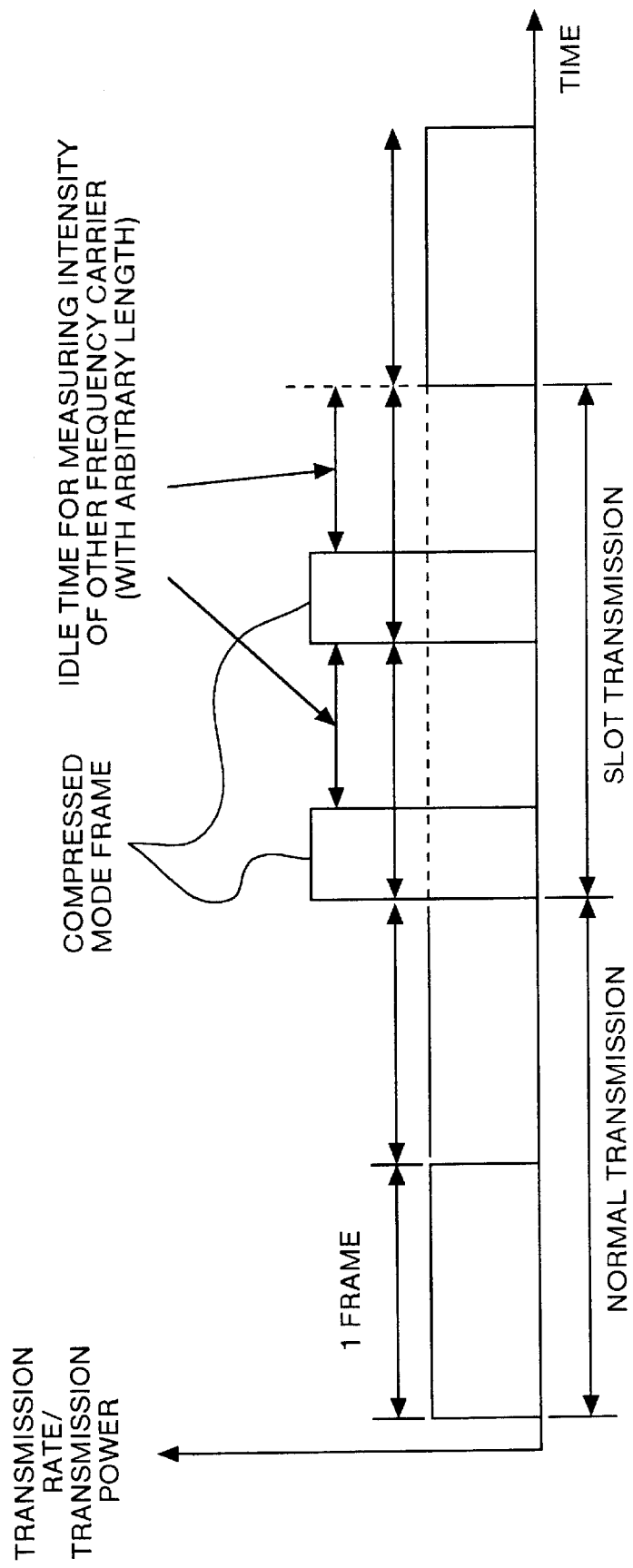
FIG. 20 is a view showing a transmission example in a normal mode and a compressed mode in a conventional CDMA cellular system.
Figure 21:
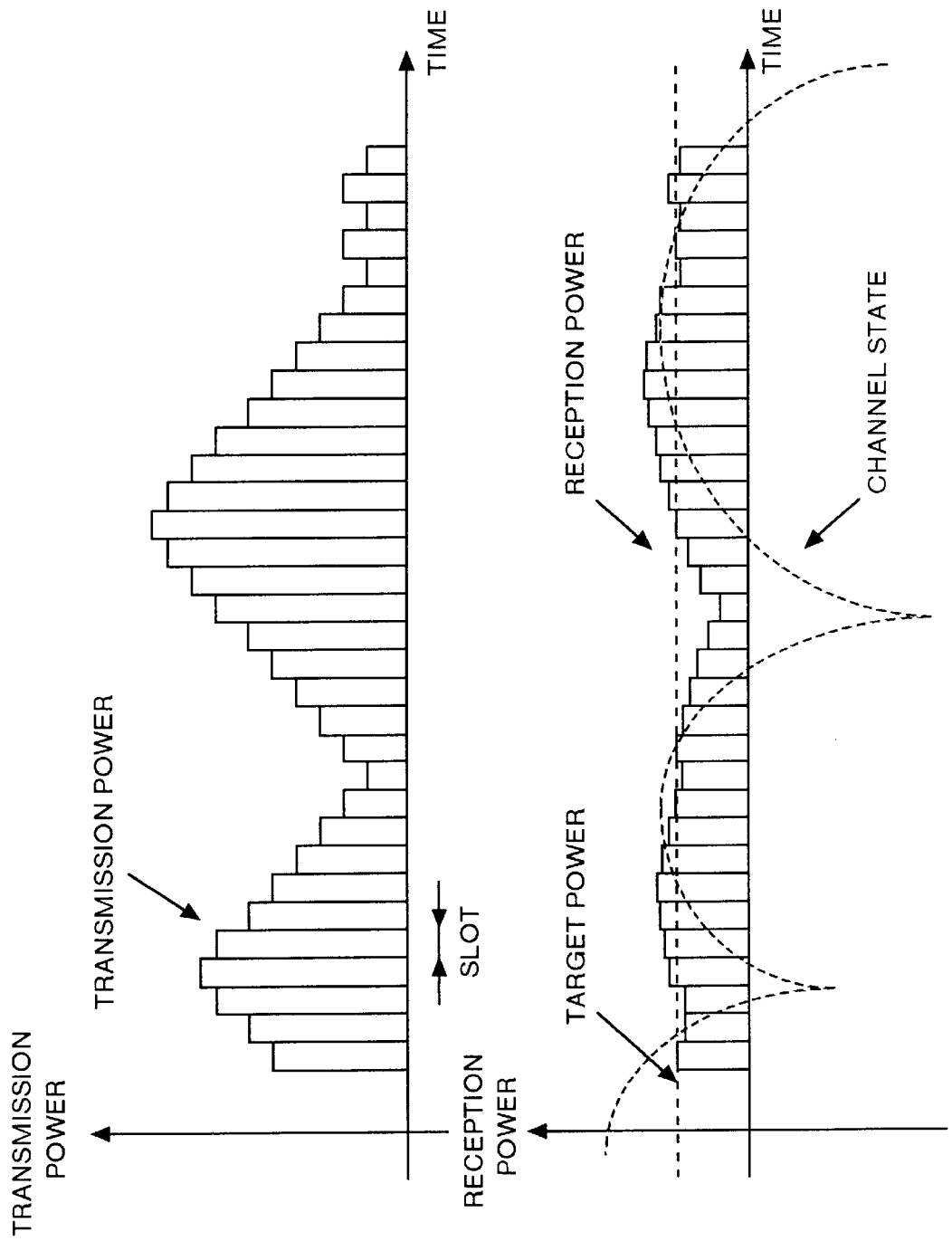
FIG. 21 is a view showing transmission power control at normal mode transmission in a conventional communication system.
Figure 22:
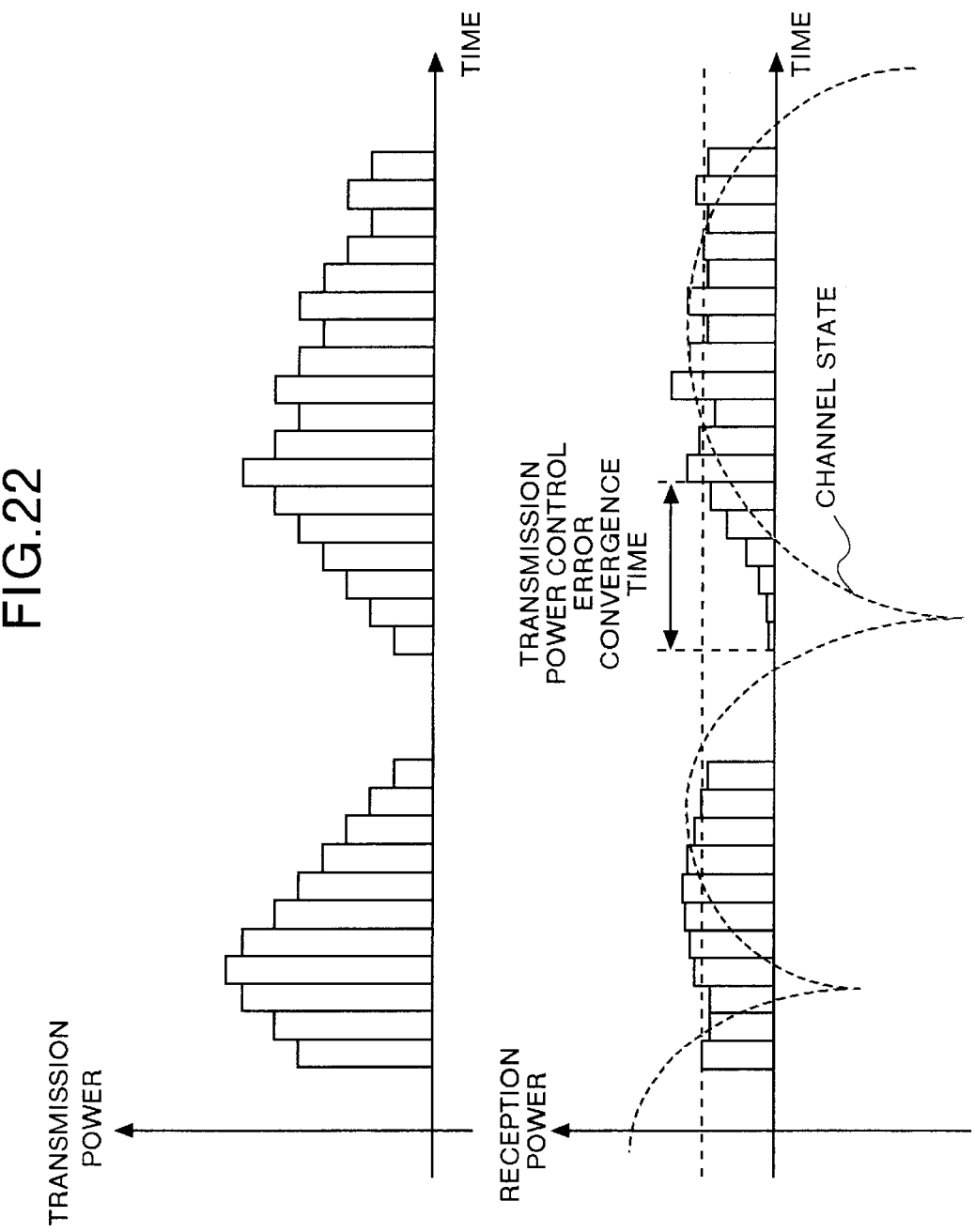
FIG. 22 is a view showing transmission power control at compressed mode transmission in a conventional communication system.
Figure 23:
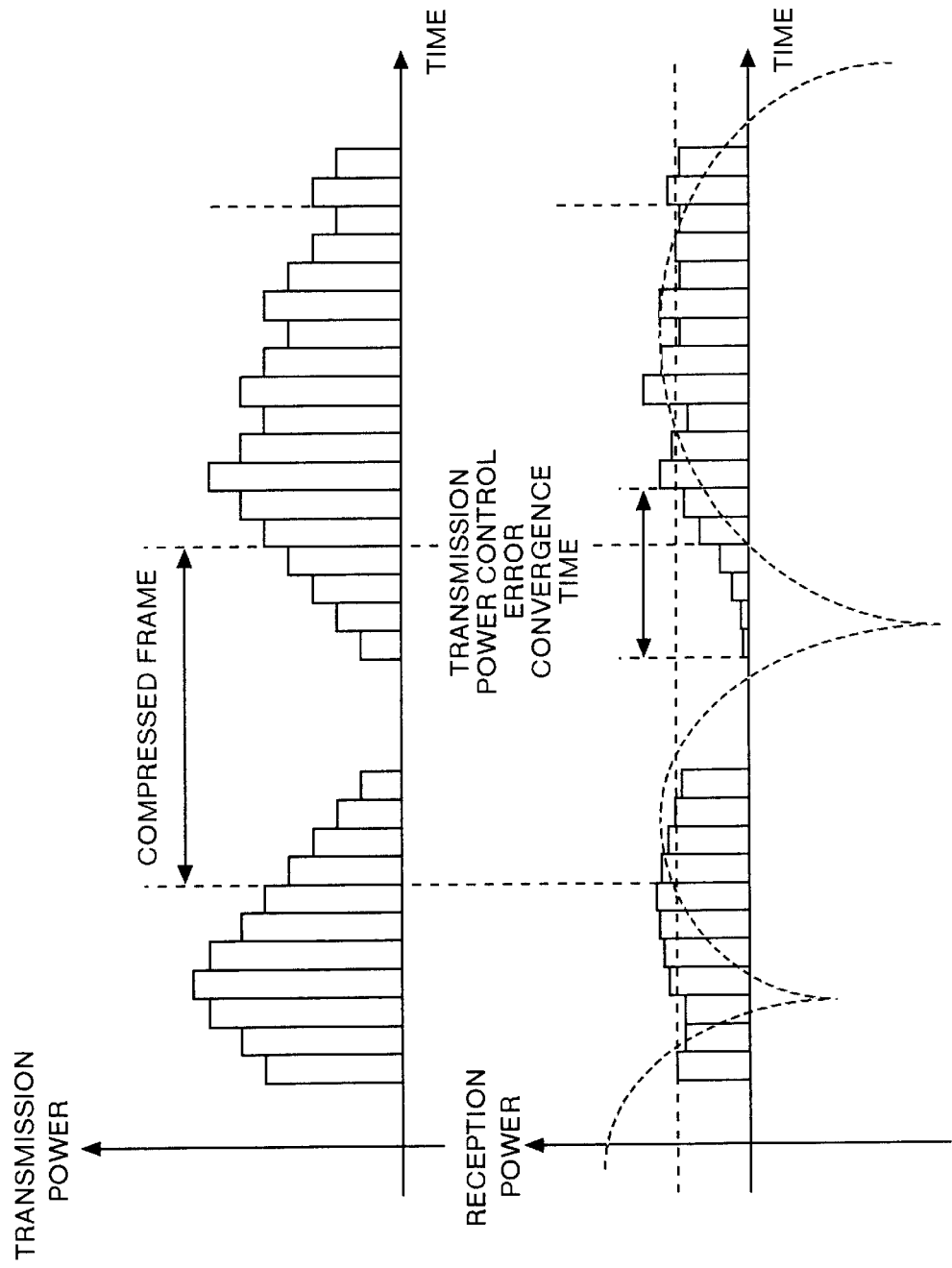
FIG. 23 is a view showing a position of an idle time at compressed mode transmission in a conventional communication system.

Next, a concrete example of the communication method between the transmitter 1C and receiver 2C will be explained. It is assumed that the idle time in the compressed mode is placed at the above-explained optimal position in the communication system shown in FIG. 14. FIG. 19 shows a flowchart of the various steps in this communication method. The steps identical with those explained in the first embodiment are labeled with like step numbers, and the explanation of these steps is not repeated for ease of explanation.

To begin with, the radio frequency receiver 15B of the receiver 2C estimates the maximum Doppler frequency based on a received reception signal at the normal mode transmission before shifting to the compressed mode transmission, and notifies the estimated value to the reception controller 21C as the fading information (Step S51). The receiver 2C notifies the estimated maximum Doppler frequency further to the transmission controller 11C in the transmitter 1C (Step S52). Then, the transmission controller 11C and reception controller 21C determine the step size in the transmission power control based on the notified Doppler frequency, and estimate a time necessary for the transmission power control error to converge, while making negotiation to determine the idle time position (Step S53). The operations afterwards are the same as those explained in the first embodiment.

As has been discussed, in the present embodiment, the step size in the transmission power control is determined in response to the fading frequency and further the transmission power control error convergence time is estimated from the step size. Thus, it is possible to set the idle time in the compressed mode with consideration given to the adverse affect of the transmission power control error caused by the idle time and the interleave effect, and also to suppress deterioration of the communication quality in the compressed mode.

The maximum Doppler frequency is not necessarily estimated by measuring the reception signal. For example, in the cellular communication, a large radius is given to the cells that provide a communication service by the base location for the service to a mobile station having a higher moving rate, such as use in an automobile or a train, whereas a smaller radius is given to the cells that provide a service to a quasi-station mobile station in use at a walking pace or in a semi-fixed station. Thus, in general, it can be the that when the cell radius is large, the fading frequency is high, and when the cell radius is small, the fading frequency is low. Hence, in this case, a similar effect can be achieved by estimating the Doppler frequency (fading frequency) based on the largeness of the cell radius and carrying out the above control.

As explained above, according to one aspect of the present invention, the position of the non-transmission time (idle time) in the compressed mode is changed in such a manner so as to minimize adverse affect of a transmission power control error that occurs after the non-transmission time, for example, with consideration given to the adverse affect of the transmission power control error and the interleave effect. Consequently, there can be offered an effect that it is possible to obtain a communication system capable of reducing adverse affect of the transmission power control error caused by the non-transmission time without adapting a conventional method, by which the non-transmission time at the compressed mode transmission is dispersed within a frame.

According to the another aspect of the present invention, adverse affect of the transmission power control error is taken into consideration, and the position of the non-transmission time in the compressed mode is determined so as to be placed rearward from the center of the compressed frame, for example. Consequently, there can be offered an effect that it is possible to obtain a communication system capable of preventing deterioration of a communication quality occurred when observing a different frequency carrier.

According to the another aspect of the present invention, the position of the non-transmission time in the compressed mode is determined so as to be placed rearward from the center of the compressed frame, for example, with consideration given to the adverse affect of the transmission power control error and the interleave effect, and further, data of at least one slot is placed after the non-transmission time within the compressed frame. Consequently, there can be offered an effect that it is possible to obtain a communication system capable of improving a communication quality in association with observation of a different frequency carrier.

According to the another aspect of the present invention, the non-transmission time is set relatively longer in a first frame and set relatively shorter in a second frame, so that a satisfactory interleave effect can be achieved even when the non-transmission time extends over first and following second frames with consideration given to adverse affect of the transmission power control error to the second frame. Consequently, there can be offered an effect that it is possible to obtain a communication system capable of suppressing deterioration of a communication quality in the compressed mode.

According to the another aspect of the present invention, the estimated value of the maximum Doppler frequency is compared with the preset threshold of the maximum Doppler frequency, and when a frequency of the estimated value is lower than the threshold, the non-transmission time is placed rearward in the compressed frame. On the other hand, when the frequency of the estimated value is higher than the threshold, negotiation is made so as not to adjust the non-transmission time, and the non-transmission time is placed near the center of the compressed frame. By changing the position of the non-transmission time in the compressed frame in response to the pitch of the fading frequency in this manner, there can be offered an effect that it is possible to obtain a communication system capable of effecting control such that does not deteriorate the interleave effect when the fading frequency is high and the transmission power control effect when the fading frequency is low.

According to the another aspect of the present invention, the step size of the transmission power control is determined in response to the fading frequency, and further, the transmission power control error convergence time is estimated based on the step size. Consequently, there can be offered an effect that it is possible to obtain a communication system capable of setting non-transmission time with consideration given to the adverse affect of the transmission power control error caused by the non-transmission time and the interleave effect, and suppressing deterioration of a communication quality in the compressed mode.

According to the another aspect of the present invention, the fading frequency is high when the cell radius is large and the fading frequency is low when the cell radius is small. Consequently, by estimating the fading frequency based on the largeness of the cell radius, there can be offered an effect that it is possible to obtain a communication system capable of setting the non-transmission time with consideration given to the adverse affect of the transmission power control error caused by the non-transmission time and the interleave effect, and suppressing deterioration of a communication quality in the compressed mode.

According to the another aspect of the present invention, the position of the non-transmission time in the compressed mode is changed in such a manner so as to minimize the adverse affect of the transmission power control error that occurs after the non-transmission time, for example, with consideration given to the adverse affect of the transmission power control error and the interleave effect. Consequently, there can be offered an effect that it is possible to obtain a transmitter capable of reducing adverse affect of the transmission power control error caused by the non-transmission time without adapting a conventional method, by which the non-transmission time at the compressed mode transmission is dispersed within a frame.

According to the another aspect of the present invention, adverse affect of the transmission power control error is taken into consideration, and the position of the non-transmission time in the compressed mode is determined so as to be placed rearward from the center of the compressed frame, for example. Consequently, there can be offered an effect that it is possible to obtain a transmitter capable of preventing deterioration of a communication quality occurred when observing a different frequency carrier.

According to the another aspect of the present invention, the position of the non-transmission time in the compressed mode is determined so as to be placed rearward from the center of the compressed frame, for example, with consideration given to the adverse affect of the transmission power control error and the interleave effect, and further, data of at least one slot is placed after the non-transmission time within the compressed frame. Consequently, there can be offered an effect that it is possible to obtain a transmitter capable of improving a communication quality in association with observation of a different frequency carrier.

According to the another aspect of the present invention, the non-transmission time is set relatively longer in a first frame and set relatively shorter in a second frame, so that a satisfactory interleave effect can be achieved even when the non-transmission time extends over first and following second frames with consideration given to adverse affect of the transmission power control error to the second frame. Consequently, there can be offered an effect that it is possible to obtain a transmitter capable of suppressing deterioration of a communication quality in the compressed mode.

According to the another aspect of the present invention, the step size of the transmission power control is determined in response to the fading frequency, and further, the transmission power control error convergence time is estimated based on the step size. Consequently, there can be offered an effect that it is possible to obtain a transmitter capable of setting the non-transmission time with consideration given to the adverse affect of the transmission power control error caused by the non-transmission time and the interleave effect, and suppressing deterioration of a communication quality in the compressed mode.

According to the another aspect of the present invention, the estimated value of the maximum Doppler frequency is compared with the preset threshold of the maximum Doppler frequency, and when a frequency of the estimated value is higher than the threshold, negotiation is made so as not to adjust the non-transmission time, and the non-transmission time is placed near the center of the compressed frame. Consequently, by changing the position of the non-transmission time in the compressed frame in response to the fading frequency, there can be offered an effect that it is possible to obtain a receiver capable of effecting control such that does not deteriorate the interleave effect when the fading frequency is high.

According to the another aspect of the present invention, the step size of the transmission power control is determined in response to the fading frequency, and further, the transmission power control error convergence time is estimated based on the step size. Consequently, there can be offered an effect that it is possible to obtain a receiver capable of setting the non-transmission time with consideration given to the adverse affect of the transmission power control error caused by the non-transmission time and the interleave effect, and suppressing deterioration of a communication quality in the compressed mode.

According to the another aspect of the present invention, the position of the non-transmission time in the compressed mode is changed in such a manner so as to minimize adverse affect of a transmission power control error that occurs after the non-transmission time, for example, with consideration given to the adverse affect of the transmission power control error and the interleave effect. Consequently, there can be offered an effect that it is possible to obtain a communication method capable of reducing adverse affect of the transmission power control error caused by the non-transmission time without adapting a conventional method, by which the non-transmission time at the compressed mode transmission is dispersed within a frame.

According to the another aspect of the present invention, adverse affect of the transmission power control error is taken into consideration, and the position of the non-transmission time in the compressed mode is determined so as to be placed rearward from the center of the compressed frame, for example. Consequently, there can be offered an effect that it is possible to provide a communication method capable of preventing deterioration of a communication quality occurred when observing a different frequency carrier.

According to the another aspect of the present invention, the position of the non-transmission time in the compressed mode is determined so as to be placed rearward from the center of the compressed frame, for example, with consideration given to the adverse affect of the transmission power control error and the interleave effect, and further, data of at least one slot is placed after the non-transmission time within the compressed frame. Consequently, there can be offered an effect that it is possible to obtain a communication method capable of improving a communication quality in association with observation of a different frequency carrier.

According to the another aspect of the present invention, the non-transmission time is set relatively longer in a first frame and set relatively shorter in a second frame, so that a satisfactory interleave effect can be achieved even when the non-transmission time extends over first and following second frames with consideration given to adverse affect of the transmission power control error to the second frame. Consequently, there can be offered an effect that it is possible to obtain a communication method capable of suppressing deterioration of a communication quality in the compressed mode.

According to the another aspect of the present invention, the estimated value of the maximum Doppler frequency is compared with the preset threshold of the maximum Doppler frequency, and when a frequency of the estimated value is lower than the threshold, the non-transmission time is placed rearward in the compressed frame. On the other hand, when the frequency of the estimated value is higher than the threshold, negotiation is made so as not to adjust the non-transmission time, and the non-transmission time is placed near the center of the compressed frame. By changing the position of the non-transmission time in the compressed frame in response to the pitch of the fading frequency in this manner, there can be offered an effect that it is possible to obtain a communication method capable of effecting control such that does not deteriorate the interleave effect when the fading frequency is high and the transmission power control effect when the fading frequency is low.

According to the another aspect of the present invention, the step size of the transmission power control is determined in response to the fading frequency, and further, the transmission power control error convergence time is estimated based on the step size. Consequently, there can be offered an effect that it is possible to obtain a communication method capable of setting the non-transmission time with consideration given to the adverse affect of the transmission power control error caused by the non-transmission time and the interleave effect, and suppressing deterioration of a communication quality caused in the compressed mode.

According to the another aspect of the present invention, the fading frequency is high when the cell radius is large and the fading frequency is low when the cell radius is small. Consequently, by estimating the fading frequency based on the largeness of the cell radius, there can be offered an effect that it is possible to obtain a communication method capable of setting the non-transmission time with consideration given to the adverse affect of the transmission power control error caused by the non-transmission time and the interleave effect, and suppressing deterioration of a communication quality in the compressed mode.

Industrial Applicability

As explained above, the communication system, transmitter and receiver, and communication method of the present invention are useful in a radio communication, such as a mobile communication and a satellite communication, and particularly suitable to the CDMA communication system, in which the other frequency carrier is observed in the compressed mode and handover is effected based the observation result.

What is claimed is:

1. A communication system including a transmitter and a receiver both capable of operating in at least one of a normal mode and a compressed mode in which setting of a predetermined non-transmission time is allowed, wherein said transmitter effects transmission power control to maintain a received target power on a frame in each mode, and, when operating in the compressed mode, said transmitter changes a position of the non-transmission time to minimize adverse effect of a transmission power control error that occurs after the non-transmission time.

2. The communication system according to claim 1, wherein, when a unit of interleaving is set to one frame, said transmitter places the non-transmission time in the compressed mode rearward from a center of a compressed frame, and said transmitter places data of at least one slot after the non-transmission time within the compressed frame, so that a satisfactory interleave effect is achieved.

3. The communication system according to claim 1, wherein, when the unit of interleaving is set to one frame and the non-transmission time extends over two frames, said transmitter places the non-transmission time in the compressed mode longer in a first frame and set relatively shorter in a second frame.

4. The communication system according to claim 2, wherein said receiver estimates maximum Doppler frequency, compares the estimated maximum Doppler frequency with a preset threshold of the maximum Doppler frequency, and when the estimated maximum Doppler frequency is higher than the threshold, negotiates with said transmitter not to effect control as to a change of the position of the non-transmission time; and when the estimated maximum Doppler frequency is lower than the threshold, said transmitter places the non-transmission time in the compressed mode rearward from the center of the compressed frame; and in an area where moving at a high speed is expected, the control as to a change of the position of the non-transmission time is not effected, and in an area where moving at a high speed is not expected, the non-transmission time in the compressed mode is placed rearward from the center of the compressed frame.

5. The communication system according to claim 2,
wherein said transmitter and receiver set a step size of power in transmission power control larger than a predetermined value set as a reference value through negotiation, and reduce a number of slots needed for the transmission power control error convergence that occurs after the non-transmission time.

6. A transmitter that operates in at least one of a normal mode and a compressed mode in which setting of a predetermined non-transmission time is allowed,
wherein said transmitter effects transmission power control to maintain a received target power on a frame in each mode, and, when operating in the compressed mode, said transmitter changes a position of the non-transmission time to minimize adverse effect of a transmission power control error that occurs after the non-transmission time.

7. The transmitter according to claim 6,
wherein, when a unit of interleaving is set to one frame, said transmitter places the non-transmission time in the compressed mode rearward from a center of a compressed frame; and
said transmitter places data of at least one slot after the non-transmission time within the compressed frame, so that a satisfactory interleave effect is achieved.

8. The transmitter according to claim 6,
wherein when a unit of interleaving is set to one frame and the non-transmission time extends over two frames, said transmitter places the non-transmission time in the compressed mode longer in a first frame and set relatively shorter in a second frame.

9. The transmitter according to claim 7,
wherein, through negotiation with a receiver, said transmitter sets a step size of power in transmission power control larger than a predetermined value set as a reference value, and reduces a number of slots needed for the transmission power control error convergence that occurs after the non-transmission time.

10. A receiver that communicates with a transmitter that changes a position of a non-transmission time,
wherein said receiver estimates maximum Doppler frequency, compares the estimated maximum Doppler frequency with a preset threshold of the maximum Doppler frequency, and when a frequency of the estimated maximum Doppler frequency is higher than the threshold, negotiates with the transmitter not to effect control as to a change of a position of a non-transmission time.

11. A receiver,
wherein said receiver, through negotiation with a transmitter, sets a step size of power in transmission power control to maintain a received target power, said step size being larger than a predetermined value set as a reference value, and reduces a number of slots necessary for a transmission power control error convergence that occurs after a non-transmission time.

12. A communication method comprising:
a transmission step and a reception step operating in at least one of a normal mode and a compressed mode in which setting of a predetermined non-transmission time is allowed, the transmission step including effecting of transmission power control to maintain a received target power on a frame in each mode,
wherein, in the transmission step, when operating in the compressed mode, a position of the non-transmission time is changed to minimize adverse effect of a transmission power control error that occurs after the non-transmission time.

13. The communication method according to claim 12,
wherein, in the transmission step, when a unit of interleaving is set to one frame, the non-transmission time in the compressed mode is placed rearward from a center of a compressed frame; and
in the transmission step, data of at least one slot is placed after the non-transmission time within the compressed frame, so that a satisfactory interleave effect is achieved.

14. The communication method according to claim 12,
wherein, in the transmission step, when a unit of interleaving is set to one frame and the non-transmission time extends over two frames, the non-transmission time in the compressed mode is set relatively longer in a first frame and set relatively shorter in a second frame.

15. The communication method according to claim 13,
wherein, in the reception step, a maximum Doppler frequency is estimated, and the estimated Doppler frequency is compared with a preset threshold of the maximum Doppler frequency, and when the estimated maximum Doppler frequency is higher than the threshold, a negotiation is made with a transmitter not to effect control as to a change of the position of the non-transmission time; and
in the transmission step, when a frequency of the estimated maximum Doppler frequency is lower than the threshold, the non-transmission time in the compressed mode is placed rearward from the center of the compressed frame; and
in an area where moving at a high speed is expected, the control as to a change of the position of the non-transmission time is not effected, and in an area where moving at a high speed is not expected, the non-transmission time in the compressed mode is placed rearward from the center of the compressed frame.

16. The communication method according to claim 13,
wherein in the transmission step and reception step, a step size of power in transmission power control is set larger than a predetermined value set as a reference value through negotiation, and a number of slots needed for the transmission power control error convergence that occurs after the non-transmission time is reduced.

17. A communication system including a transmitter and a receiver both capable of operating in at least one of a normal mode and a compressed mode in which setting of a predetermined non-transmission time is allowed, wherein the transmitter effects transmission power control on a frame in each mode, and comprises:
a transmission power control unit controlling a transmission power after the non-transmission time in the compressed mode; and
a frame generation unit placing a center of the non-transmission time rearward from a center of a compressed frame.

18. A transmitter operating in at least one of a normal mode and a compressed mode in which setting of a predetermined non-transmission time is allowed, effecting transmission power control on a frame in each mode, and comprising:
a transmission power control unit controlling a transmission power after the non-transmission time in the compressed mode; and a frame generation unit placing a center of the non-transmission time rearward from a center of a compressed frame.

19. A communication method including the steps of transmitting and receiving, the steps both operating in at least one of a normal mode and a compressed mode in which setting of a predetermined non-transmission time is allowed, wherein the step of transmitting effects transmission power control, and comprises:

a transmission power control step of controlling a transmission power after the non-transmission time in the compressed mode; and a frame generation step of placing a center of the non-transmission time rearward from a center of a compressed frame.

* * * * *